(12) United States Patent
Wang et al.

(10) Patent No.: US 10,548,112 B2
(45) Date of Patent: Jan. 28, 2020

(54) METHOD FOR PERFORMING MOBILE COMMUNICATIONS, MOBILE TERMINAL DEVICE, AND MOBILE BASEBAND PROCESSING CIRCUIT

(71) Applicant: Intel IP Corporation, Santa Clara, CA (US)

(72) Inventors: Yuanyuan Wang, Beijing (CN); Ajay Panchal, San Diego, CA (US); Yucheng Dai, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/757,378

(22) PCT Filed: Sep. 18, 2015

(86) PCT No.: PCT/CN2015/089905
§ 371 (c)(1),
(2) Date: Mar. 5, 2018

(87) PCT Pub. No.: WO2017/045188
PCT Pub. Date: Mar. 23, 2017

(65) Prior Publication Data
US 2019/0029001 A1    Jan. 24, 2019

(51) Int. Cl.
*H04W 72/00* (2009.01)
*H04W 4/06* (2009.01)
(Continued)

(52) U.S. Cl.
CPC .......... *H04W 72/005* (2013.01); *H04W 4/06* (2013.01); *H04W 68/02* (2013.01); *H04W 68/10* (2013.01); *H04L 12/189* (2013.01)

(58) Field of Classification Search
None
See application file for complete search history.

(56) References Cited

U.S. PATENT DOCUMENTS

2015/0296385 A1*  10/2015  Zhang ................... H04W 16/14
370/329

FOREIGN PATENT DOCUMENTS

| CN | 101998271 A | 3/2011 |
|---|---|---|
| WO | 2011116661 A1 | 9/2011 |
| WO | 2014052412 A2 | 4/2014 |

OTHER PUBLICATIONS

International Search Report based on application No. PCT/CN2015/089905 (11 pages) dated May 27, 2016 (Refernce Purpose Only).
(Continued)

*Primary Examiner* — Diane L Lo
(74) *Attorney, Agent, or Firm* — Viering, Jentschura & Partner mbB

(57) ABSTRACT

A mobile terminal device may include a radio processing circuit and a baseband processing circuit adapted to interact with the radio processing circuit. The baseband processing circuit may be configured to identify one or more multicast control data notification messages available for reception during a first multicast control data window, determine whether any of the one or more multicast control data notification messages are not received during the first multicast control data window, and trigger receiving of multicast control data of a second multicast control data window when a predefined quantity of the one or more multicast control data notification messages are not received during the first multicast control data window.

24 Claims, 13 Drawing Sheets

(51) Int. Cl.
*H04W 68/02* (2009.01)
*H04W 68/10* (2009.01)
*H04L 12/18* (2006.01)

(56) References Cited

OTHER PUBLICATIONS

3GPP TSG-RAN, Discussion of MBMS operation for NCT, Aug. 2013, 4 pages, WG1 meeting #74, R1-133042, Barcelona, Spain.

\* cited by examiner

METHOD FOR PERFORMING MOBILE COMMUNICATIONS, MOBILE TERMINAL DEVICE, AND MOBILE BASEBAND PROCESSING CIRCUIT

RELATED APPLICATIONS

The present application is a national stage entry according to 35 U.S.C. § 371 of PCT application No.: PCT/CN2015/089905 filed on Sep. 18, 2015, which is incorporated herein by reference in its entirety.

TECHNICAL FIELD

Various embodiments relate generally to methods for performing mobile communications, mobile terminal devices, and mobile baseband processing circuits.

BACKGROUND

The recent introduction of evolved Multimedia Broadcast Multicast Services (eMBMS) by the $3^{rd}$ Generation Partnership (3GPP) in Long Term Evolution (LTE) Release 9 has introduced a new system for delivering multimedia content, such as e.g. streaming video, audio, text, "push" data, operating system/application updates, etc., to multiple users simultaneously. eMBMS as specified by 3GPP may utilize a Multicast Broadcast Single Frequency Network (MBSFN), and may coordinate the transmission of multimedia data over a common subcarriers by multiple base station.

In order to receive desired MBSFN data traffic, herein referred to as user data, a mobile terminal may need to also receive MBSFN control data, such as e.g. from a serving cell. Such control data may specify important information regarding user data, such as scheduling information for the user data. As opposed to transmitting the control data only a single time, active MBSFN cells (i.e. non-reserved cells that are part of an MBSFN area, as will be later detailed) may transmit the control data in a repetitive fashion, such as by transmitting identical control data multiple times within a specific time window (i.e. according to an MCCH repetition period during a given MCCH modification period, as will be later detailed). Accordingly, mobile terminals select a convenient instance to receive the control data within the specific time window, and may be free to perform other operations during the remaining repetitive control data instances of the specific time window.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
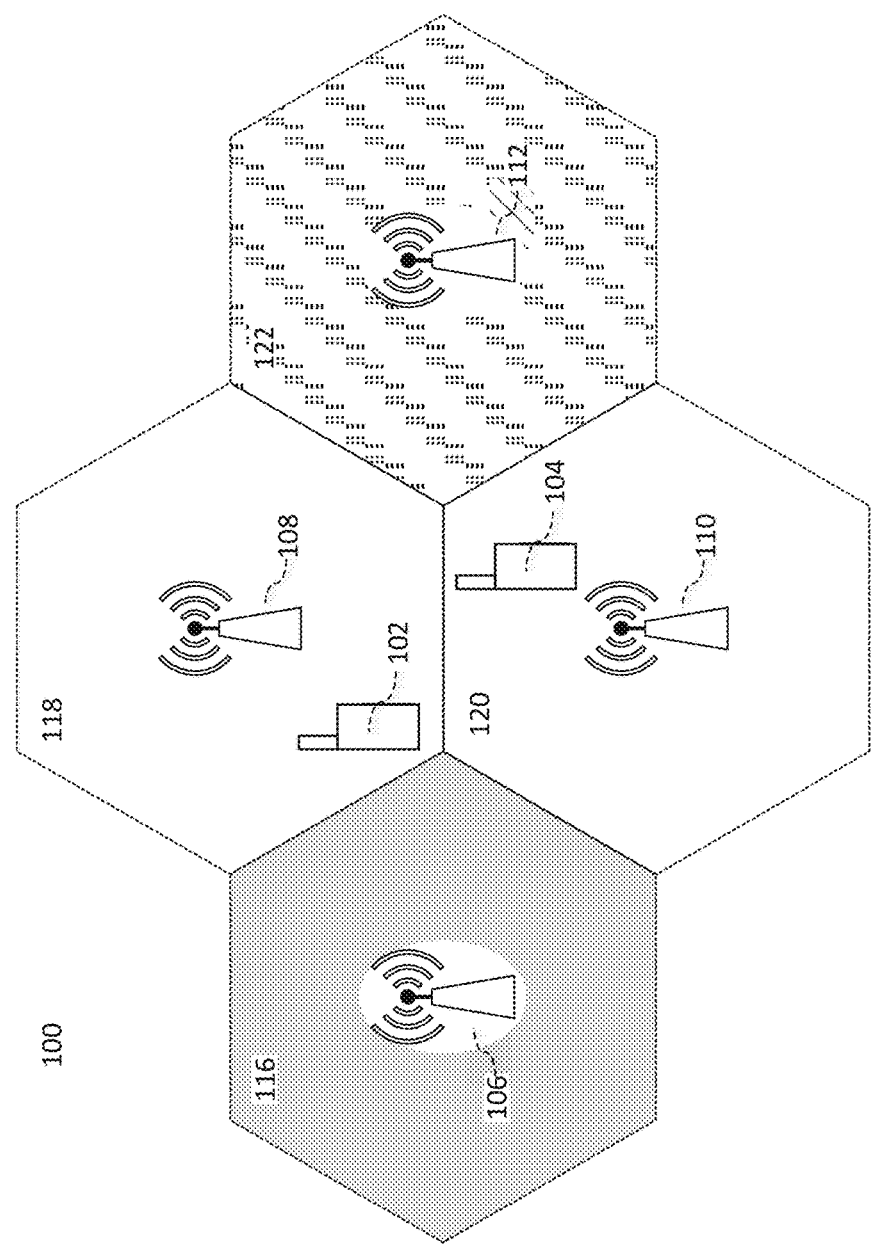
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as \V LAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

Unless explicitly specified, the terms "transmit" and "send" encompass both direct and indirect transmission/sending. Similarly, the term "receive" encompasses both direct and indirect reception unless explicitly specified. As utilized herein, the term "derived from" designates being obtained directly or indirectly from a specific source. Accordingly, data derived from a source includes data obtained directly from the source or indirectly from the source, i.e. through one or more secondary agents.

The 3rd Generation Partnership Project (3GPP) has introduced a Multicast Broadcast Single Frequency Network (MBSFN) architecture in Long Term Evolution (LTE) Release 9 to support evolved Multimedia Broadcast Multicast Services (eMBMS). In an MBSFN supporting eMBMS, multiple base stations may transmit multimedia data to any proximate users, i.e. mobile terminals, using the same set of frequency resources (i.e. the same set of frequency subcarriers). Such an MBSFN architecture may thus be utilized to provide multimedia data, including e.g. streaming video, audio, text, "push" data, operating system/application updates, etc., to any users within the coverage area.

FIG. 1 shows mobile communication network 100. Mobile communication network may be include at least mobile terminals 102 and 104 and base stations 106-112 with respectively corresponding and coverage regions 116-122. It is appreciated that mobile communication network is exemplary in nature and may thus be abbreviated for purposes of explanation.

Base stations 106-112 may each be associated with a radio access section of mobile communication 100, i.e. the Radio Access Network (RAN) of mobile communication network 100. Base stations 106-112 may thus act as an interface between the RAN of mobile communication network 100 and an underlying core network of mobile communication network 100, and may allow any proximate mobile terminals, such as e.g. mobile terminals 102 and/or 104, to exchange data with the core network of mobile communication network 100 and any further networks connected thereto.

Each of base stations 106-112 may respectively provide mobile communication coverage to coverage regions 116-122, which may correspond to a single cell (i.e. sector) of a respective one of base stations 106-112 or may be composed of multiple cells (i.e. sectors) of a respective one of base stations 106-112. As shown in FIG. 1, mobile terminals 102 and 104 may be physically located within coverage regions 118 and 120 of base stations 108 and 110, respectively. It is appreciated that although coverage regions 116-122 are depicted as having distinct boundaries, it is understood that one or more of coverage regions 116-112 may overlap, and accordingly there may exist geographical regions served by two or more of base stations 106-112.

As specified by 3GPP, cells supporting MBSFN transmission of eMBMS data may be assigned to one or more MBSFN Areas, i.e. groups of cells providing synchronized transmission of a specific eMBMS stream using a common set of frequency resources, i.e. the same set of one or more subcarriers. Each cell may be assigned to one or more MBSFN Areas, and thus may be configured to provide one or more eMBMS streams to any proximate users. MBSFN Areas may include active cells and reserved cells, where active cells provide the eMBMS stream of the MBSFN Area and reserved cells do not provide the eMBMS stream (and e.g. may not support any eMBMS transmission). Furthermore, each cell may be configured according to either dedicated mode or MBSFN/unicast mode, where dedicated cells may utilize all available system bandwidth (i.e. all subcarriers) for MBSFN communications and MBSFN/unicast cells may perform both traditional unicast and MBSFN communications, such as e.g. utilizing a time division duplex scheme between unicast and MBSFN in which only certain sub-frames contain MBSFN data.

Base stations 106-112 may be configured to provide multimedia data, e.g. eMBMS data, to any proximate mobile terminals within respective coverage regions 116-122, such as e.g. mobile terminals 102 and 104. Specifically, base stations 106-112 may each be assigned to one or more MBSFN Areas. As depicted by the white and gray shading in FIG. 1, base stations 108, 110, and 112 may be assigned to MBSFN Area 0, where base station 112 is a reserved cell of MBSFN Area 0. Similarly, base station 106 may be assigned to MBSFN Area 1.

Accordingly, base stations 108 and 110 may transmit a first eMBMS stream of MBSFN Area 0, where base station 112 may not transmit the first eMBMS stream as base station 112 is composed exclusively of one or more reserved cells. As previously indicated, it is appreciated that base stations 106-112 may be composed of multiple cells, i.e. sectors, where each cell may be individually assigned to an MBSFN Area and/or to active/reserved status. For purposes of explanation, each of base stations 106-112 may be assumed to have cells that are collectively assigned to a single MBSFN Area and/or active reserved status (in accordance with the shading of coverage regions 116-122 in FIG. 1), although such may not necessarily apply in other exemplary scenarios. It is appreciated that MBSFN Area assignment may be assumed static, i.e. the MBSFN Area assignment of a cell may not change dynamically over time.

As depicted in FIG. 1, mobile terminals 102 and 104 may be located in respective coverage regions 118 and 120 of base stations 108 and 110, which as previously specified may be assigned to MBSFN Area 0. Accordingly, base stations 108 and 110 may provide a first eMBMS stream, which may be received by mobile terminals 108 and 110.

As previously indicated, there may exist geographic overlap between coverage regions 116-122. For example, coverage regions 118 and 120 may substantially overlap, and accordingly mobile terminals 102 and 104 may receive wireless transmissions from both of base stations 108 and 110. Accordingly, mobile terminals 102 and 104 may receive multiple instances of transmissions of the first eMBMS stream, i.e. one instance from base station 108 and another instance from base station 110 (in addition to any further multipaths). Accordingly, as base stations 108 and 110 are synchronized for transmission of the first eMBMS stream and utilize the same wireless resources, mobile terminals 102 and 104 may utilize the multiple received instances of the first eMBMS stream, and may consequently utilize signal combination to improve receiver performance. The synchronous nature of cells of the same MBSFN Area may thus improve system performance.

As base station 112 is a reserved cell, base station 112 may not provide the first eMBMS stream. However, base station 112 may be synchronized with the other base stations (e.g. on a cell level) of MBSFN Area 0 (e.g. base stations 108 and 110) in order to limit interference on transmission of the first eMBMS stream.

Figure 2:
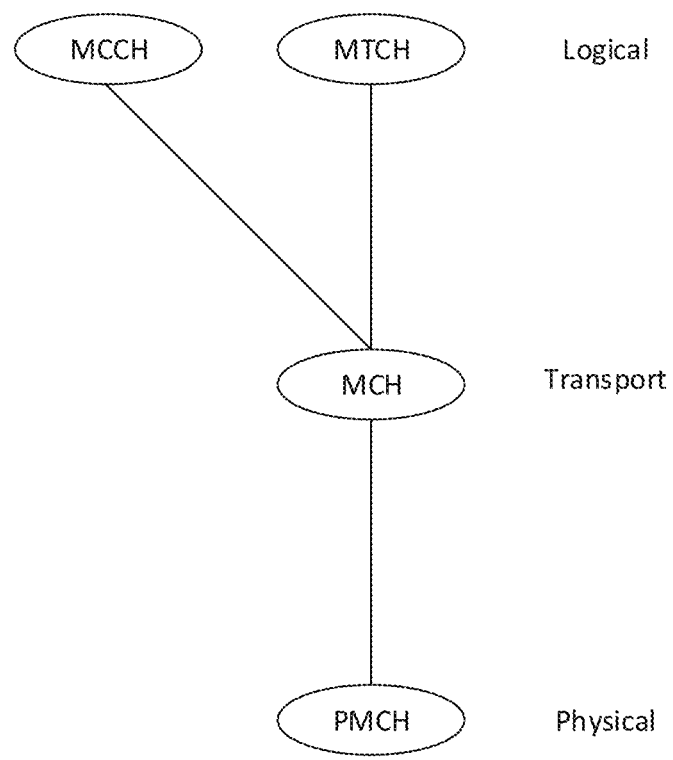
FIG. 2 shows a channel mapping hierarchy for multicast data.

The first eMBMS stream may be composed of both control data and user data, which may each be respectively mapped to the Multicast Control Channel (MCCH) and Multicast Traffic Channel (MTCH) logical channels. The channel mapping for the logical, transport, and physical channels is depicted in FIG. 2. As shown in FIG. 2, the MCCH and MTCH logical channels are mapped to the Multicast Channel (MCH) transport channel, which is then mapped to the Physical Multicast Channel (PMCH) physical channel.

Accordingly, the PMCH may carry both control data (MCCH) and user data (MTCH). PMCH data may only be transmitted during certain MBSFN subframes, which may be configured by higher layers and synchronized between cells of the same MBSFN Area. In order to receive a given eMBMS stream, a mobile terminal may need to receive both MCCH (i.e. control data) and MTCH data (i.e. the actual stream composed of user data).

Transmission of MCCH and MTCH data may occur according to a predefined schedule. As previously indicated, PMCH data may only be transmitted during certain MBSFN subframes, which may be time-division duplexed with traditional unicast subframes. Furthermore, only certain radio frames may contain MBSFN subframes.

As specified by 3GPP for an LTE network configuration, each radio frame (e.g. in a Frequency Division Duplexing (FDD) scheme for uplink-downlink) may be composed of 10 subframes of 1 millisecond each, where each subframe is divided into two slots of 0.5 milliseconds each. Each radio frame may be assigned a System Frame Number (SFN) (which may repeat according to a period configured by higher layers). Similarly, each subframe may be assigned a subframe index from 0-9.

Figure 3:
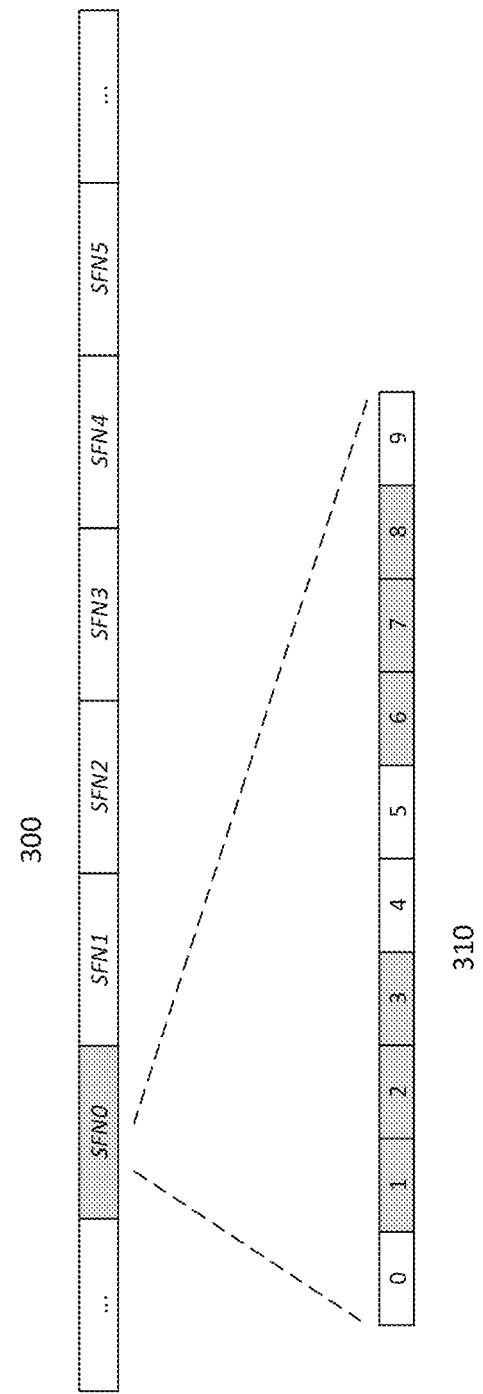
FIG. 3 shows a timing flowchart for multicast data in a Long Term Evolution (LTE) network configuration.

FIG. 3 shows an exemplary illustration of radio frame sequence 300 and subframe sequence 310.

As shown in FIG. 3, radio frame sequence 300 may include at least radio frames SFN0-SFN5, corresponding to System Frame Numbers 0-5. Each of radio frames SFN0-SFN5 may be divided into 10 subframes of 1 millisecond duration, as shown for SFN0 in subframe sequence 310.

SFN0 may be configured as a radio frame containing MBSFN subframes, as indicated by the gray shading of SFN0. As specified by 3GPP, up to 6 total subframes in a given MBSFN radio frame such as SFN0 may be MBSFN subframes, as indicated by the gray shading of subframes 1-3 and 6-8 of subframe sequence 310. As specified by 3GPP, subframe indices 1-3 and 6-8 (out of a possible index set of 0-9) may be MBSFN subframes.

The scheduling of MBSFN radio frames and MBSFN subframes may be specified by the mobile communication network in the form of System Information Block (SIB) messages. As specified by 3GPP, System Information Block Type 2 (SIB2) messages may designate the MBSFN radio frames for all MBSFN Areas, and may designate which subframes of the specified MBSFN radio frames are MBSFN subframes available to all MBSFN Areas. SIB13 messages may designate the specific MBSFN subframes for each individual MBSFN Area.

Accordingly, mobile terminals 102 and 104 may first read SIB2 and SIB13 messages in order to begin receiving the first eMBMS stream, such as by receiving the SIB2 and SIB13 messages from e.g. base stations 108 and 110. Upon receiving and decoding the SIB2 and SIB13 messages, mobile terminals 102 and 104 may determine the scheduling information for the MCCH and MTCH of the first eMBMS stream, which mobile terminals 102 and 104 may subsequently utilize to receive the first eMBMS stream.

For purposes of explanation, the following description may focus on mobile terminal 102, although it is appreciated that the following description may equivalently apply to e.g. mobile terminal 104 in addition to any further mobile terminal.

Mobile terminal 102 may read an SIB2 message (i.e. by a baseband modem component of mobile terminal 102, as will be later detailed), e.g. received from base station 108, which may identify which radio frames contain MBSFN subframes, e.g. by specifying a period, offset, and distribution (i.e. the number of consecutive radio frames contain MBSFN subframes). The SIB2 may further specify which subframes within the identified radio frames are MBSFN subframes. The radio frames and MBSFN subframes may apply to all MBSFN Areas, and thus may indicate the total set of timing resources available for all MBSFN Areas.

Mobile terminal 102 may also read an SIB13 message (i.e. by a baseband modem component of mobile terminal 102, as will be later detailed). The SIB13 message may further specify information regarding each MBSFN Area, including e.g. MBSFN Area 0.

Specifically, the SIB13 message may indicate the scheduling information of MCCH data for each MBSFN Area, which mobile terminal 102 may then utilize to receive MCCH data.

The MCCH may include an MBSFN Area Configuration Message, which may be essential for receiving MTCH data. Accordingly, by reading the MCCH, mobile terminal 102 may identify how to receive the MTCH data containing the user data traffic for the first eMBMS stream.

The MBSFN Area Configuration Message may provide important scheduling information, including Common Subframe Allocation (CSA) and MCH Scheduling Period (MSP) for a given MBSFN Area, i.e. the MBSFN Area corresponding to the MCCH. Mobile terminal 102 may read the MCCH to obtain the CSA and MSP from the MBSFN Area Configuration Message. The MSP may indicate the location of MCH Scheduling Information (MSI) (e.g. conventionally at the beginning of the MSP), which mobile terminal 102 may utilize in order to identify the scheduling of the MTCH data. Mobile terminal 102 may then receive the MTCH data using the MSI and provide the multimedia data to a user, thereby facilitating reception of the first eMBMS stream.

Accordingly, reception of MCCH may be essential in order to receive an eMBMS stream. Failure to receive MCCH data, or receiving incorrect or expired MCCH data, may have severe negative impacts on reception of an eMBMS stream.

In order to allow for less restricted reception scheduling requirements, 3GPP has specified that MCCH data may be transmitted repetitively, i.e. the same MCCH data (i.e. MCCH containing the same MBSFN Area Configuration Message) may be transmitted multiple times. Accordingly, mobile terminal 102 may not be restricted by the need to receive MCCH data during only a single allocated time period, and may instead choose to receive MCCH during a convenient MCCH transmission instance from the overall set of MCCH repetition instances. Accordingly, a mobile terminal may be free to perform other operations, such as unicast communications or measurements in a relatively uninterrupted manner while occasionally selecting an opportune time to receive MCCH.

Accordingly, 3GPP has introduced MCCH repetition periods and MCCH modification periods, which are indicated for each MBSFN Area in SIB13. MCCH messages may be transmitted according to the MCCH repetition period, where each MCCH message occurring in a given MCCH modification period is identical, i.e. contains the same MBSFN Area Configuration Message. A mobile terminal may thus need to only receive a single MCCH message during a given MCCH modification period in order to ensure current MCCH information is obtained.

Figure 4:
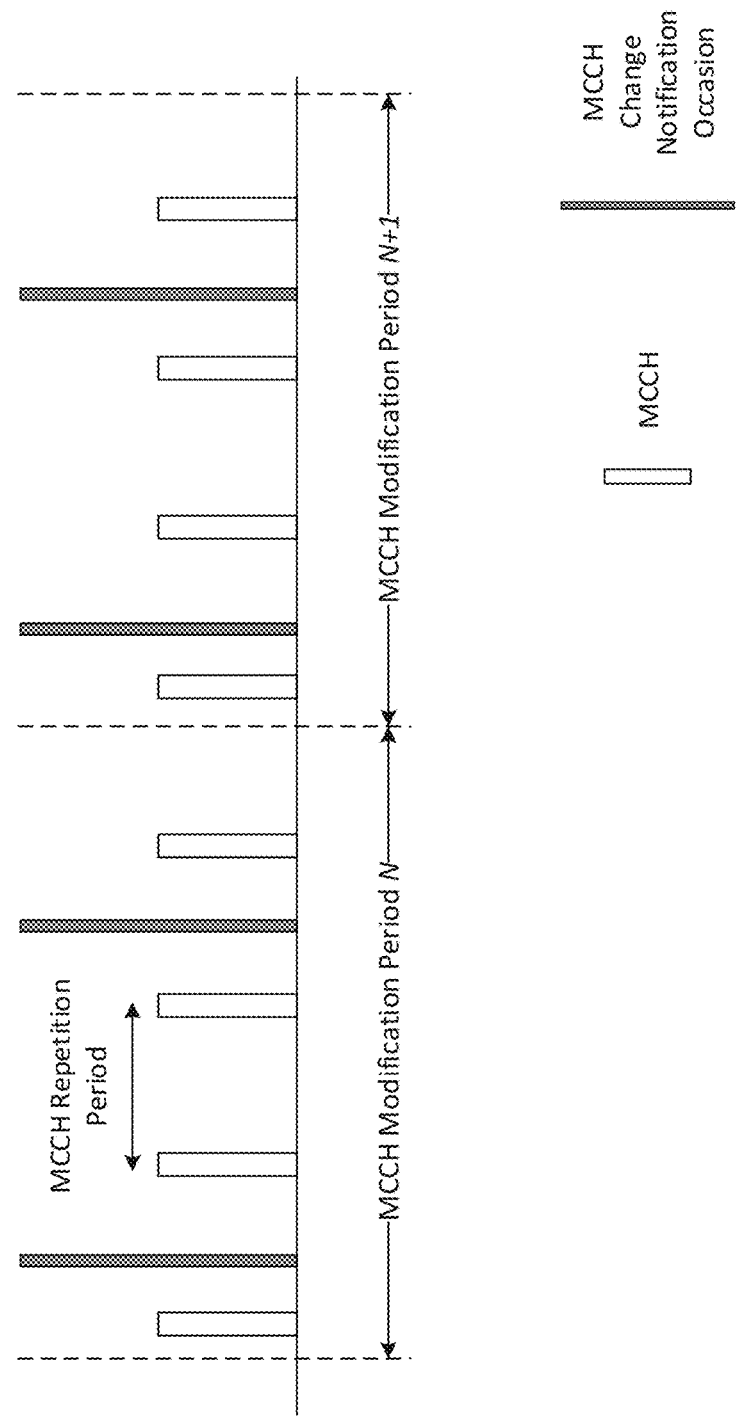
FIG. 4 shows a timing diagram for multicast data according to a first exemplary scenario.

FIG. 4 shows an illustration of an MCCH message sequence. Each MCCH message may be transmitted periodically (i.e. by a base station of a given MBSFN Area corresponding to the MCCH) according to the MCCH repetition period. The MCCH repetition period may be specified in SIB13, such as a period of 32, 64, 128, or 256 radio frames. Accordingly, MCCH messages may be transmitted, and thus received, once every MCCH repetition period. Mobile terminal 102 may read SIB13 to determine the MCCH repetition period and offset (in addition to any other required scheduling information) in order to identify the exact reception schedule of MCCH messages.

As previously indicated, identical MCCH messages may be transmitted repeatedly according to an MCCH modification period, which is also specified in SIB13. Accordingly, each MCCH message occurring (i.e. periodically occurring according to the MCCH repetition period) in a given MCCH modification period will contain the same MBSFN Area Configuration Message. A mobile terminal may obtain current MCCH information by receiving one MCCH message per MCCH modification period, which may be e.g. 512 or 1024 radio frames.

If mobile terminal 102 is actively receiving MTCH, i.e. the first eMBMS stream of MBSFN Area 0 has an active MTCH, mobile terminal 102 may be required to receive an MCCH message at least once per MCCH modification period, thereby maintaining up-to-date MCCH information. Mobile terminal 102 may therefore perform successful reception of MTCH data based on the MTCH scheduling information contained in the up-to-date MBSFN Area Configuration Message of the MCCH message.

Mobile terminal 102 may thus read the first MCCH message, i.e. the first MCCH repetition instance during a given MCCH modification period. If mobile terminal 102 does not successfully receive the first MCCH message, mobile terminal 102 may attempt to read e.g. the next MCCH message or a subsequent MCCH message. Alternatively, mobile terminal 102 may attempt to read any of the MCCH messages occurring during the given MCCH modification period, and may not necessarily need to attempt to read the first MCCH modification period.

As MTCH data is already being actively received, reception of an MCCH message during each MCCH modification period may not require significant additional power. However, if the MTCH is not active, i.e. not MTCH data is being transmitted, reception of MCCH message may require significant additional power. Accordingly, mobile terminal 102 may desire not to receive an MCCH message during each MCCH modification period if the MTCH is not active.

Accordingly, 3GPP has additionally specified the use of MCCH change notifications, which are additionally illustrated in FIG. 4. MCCH change notifications may be included in Physical Downlink Control Channel (PDCCH) Downlink Control Information (DCI) Format 1C. An MCCH change notification may be a MBMS Radio Network Temporary Identifier (M-RNTI), and may indicate if any the MCCH of any MBSFN Areas will change, i.e. in the next MCCH modification period. For example, an MCCH change notification may indicate one or more MBFSN Areas for which MCCH will undergo a change, such as with one or more 8 bit fields to indicate one or more of the 256 possible MBSFN Areas. Accordingly, mobile terminal 102 may read the PDCCH data to determine if an MCCH change notification applies to MBSFN Area 0, i.e. the first eMBMS stream. If the MCCH change notification indicates that the MCCH for MBSFN Area 0 will change, mobile terminal 102 may determine that MCCH data in the next (i.e. immediately following) MCCH modification period must be read. Accordingly, mobile terminal 102 may proceed to read at least one MCCH message in the next MCCH modification period.

SIB13 may also indicate the scheduling of MCCH change notifications, which may occur e.g. two times or four times per MCCH modification period. Such may be designated according to an MCCH change notification repetition coefficient, which may specify the total number of MCCH change notification messages per MCCH modification period.

If the MTCH is not active, mobile terminal 102 may not read an MCCH message during each MCCH modification period. Instead, mobile terminal 102 may read PDCCH data for an MCCH change notification. If the MCCH change notification indicates that the MCCH for MBSFN Area 0 will change, mobile terminal 102 may read an MCCH message during the next MCCH modification period (or e.g. any subsequent MCCH modification period, although reading an MCCH message during the immediately following MCCH modification period may be preferable for performance purposes). If the MCCH change notification does not indicate that the MCCH for MBSFN Area 0 will change, mobile terminal 102 may not read an MCCH message during the next MCCH modification period, and instead may again read PDCCH data for an MCCH change notification to identify if the MBSFN Area 0 MCCH will change for the next following MCCH modification period. For the duration of time that the MTCH remains inactive, mobile terminal 102 may read PDCCH data for MCCH change notifications during each MCCH modification period while only reading MCCH messages if the MCCH change notification from the preceding MCCH modification period indicated that the MCCH would change.

Accordingly, mobile terminal 102 may conserve battery power by reading MCCH change notifications on the PDCCH (which may be performed regardless of MCH reception) as opposed to reading an MCCH message during each MCCH modification period as long as MTCH is inactive. If MTCH is active, mobile terminal 102 may receive an MCCH message during each MCCH modification period.

Mobile terminal 102 may only need to receive PDCCH data to read an MCCH change notification once per modification period. In other words, if reception of a potential MCCH change notification is missed, i.e. an MCCH change notification instance is missed, mobile terminal 102 may still be able to determine if the MBSFN Area 0 MCCH will change by reading another MCCH change notification during the same MCCH modification period. As MCCH change notifications may be repeated multiple times) during an MCCH modification period (e.g. two times, four times, etc., according to an MCCH change notification repetition coefficient specified in SIB13), mobile terminal 102 may have multiple occasions to receive MCCH change notifications during any given MCCH modification period to identify if the MBSFN Area 0 MCCH will change.

However, use cases may occur in which the procedure detailed above may fail to maintain current MCCH data, thereby potentially resulting in failure to receive an eMBMS data stream due to lack of accurate MTCH scheduling information.

Figure 5:
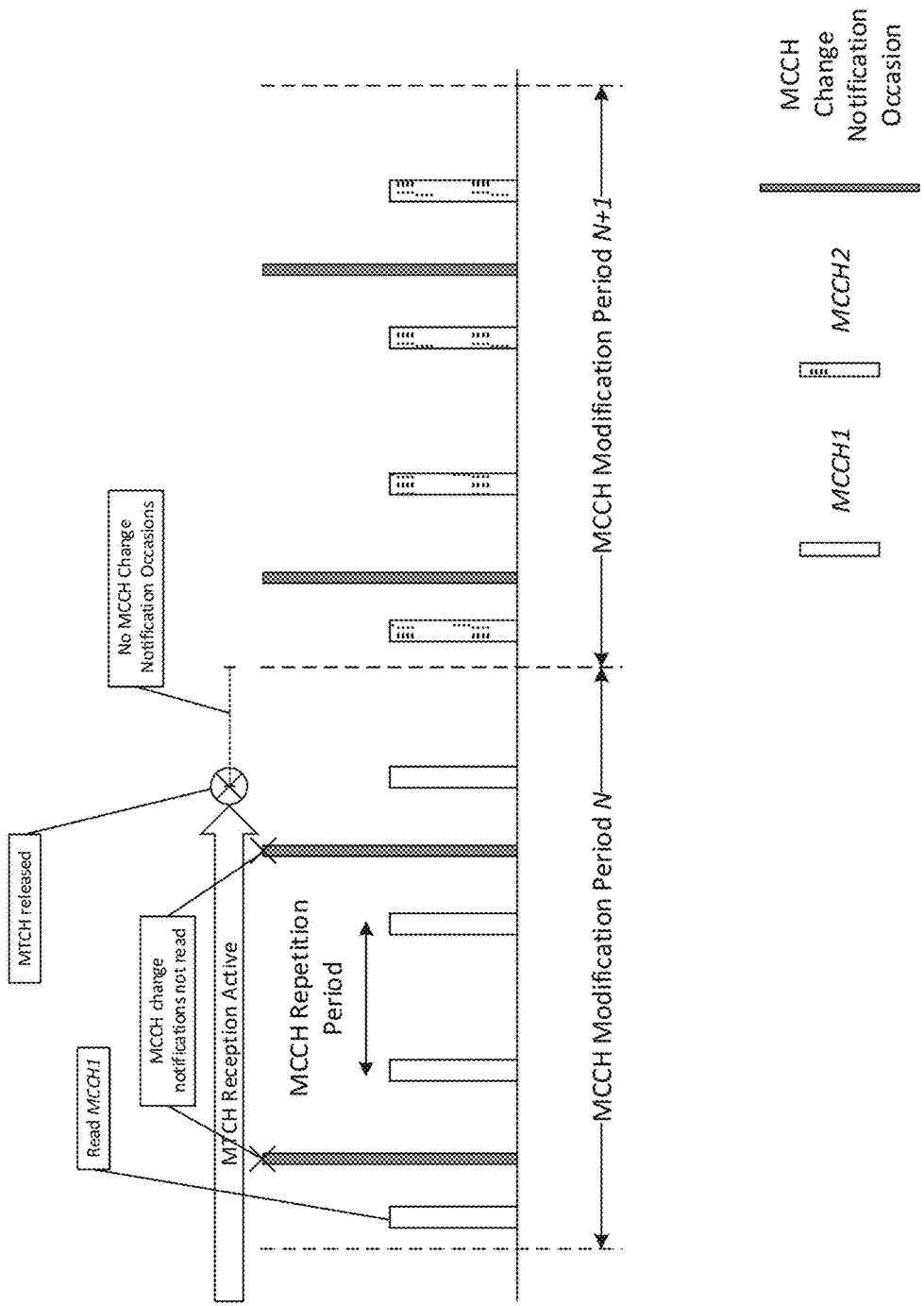
FIG. 5 shows a timing diagram for multicast data according to a second exemplary scenario.

Such an exemplary scenario is depicted in FIG. 5, which illustrates MCCH messages and MCCH change notification instances similarly as detailed regarding FIG. 4.

Mobile terminal 102 may initially be receiving an active MTCH during MCCH modification period N, i.e. the MBSFN Area 0 MTCH is active. Accordingly, mobile terminal 102 may read an MCCH message, i.e. an MCCH message containing MCCH information MCCH1 containing a first MBSFN Area Configuration message. As mobile terminal 102 is reading an MCCH message during each MCCH modification period, mobile terminal 102 may not need to read MCCH change notifications, and accordingly may skip the MCCH change notification instances during MCCH modification period N However, the MBSFN Area 0 MTCH may be released, i.e. may terminate, during MCCH modification period N as shown in FIG. 5. The MBSFN Area 0 MTCH may terminate after the last MCCH change notification instance. Accordingly, mobile terminal 102 may not be aware of whether the MBSFN Area 0 MCCH will change during the next MCCH modification period, i.e. MCCH modification period N+1.

Therefore, if mobile terminal 102 follows the procedure outlined above of only reading an MCCH message when MTCH is inactive if an MCCH change notification indicated an MCCH change, mobile terminal 102 will not obtain the updated MCCH information, MCCH2, provided in MCCH modification period N+1. Accordingly, mobile terminal 102 may be left with expired MCCH information MCCH1 instead of current MCCH information MCCH2.

Consequently, there may exist a "hole" in which mobile terminal 102 fails to obtain updated MCCH information if an active MTCH is released after all MCCH change notification instances in a given MCCH modification period have already occurred. While it may be possible that the missed MCCH change notification instances did not indicate an upcoming MCCH change (i.e. the MCCH change notifications in MCCH modification period N did not specify that the MBSFN Area 0 MCCH will change), there may be a significantly high penalty for missing an MCCH change notification. MCCH changes may occur relatively infrequently, such as e.g. up to every several hours, and accordingly mobile terminal 102 may be left with expired MCCH information for extended durations of time. For example, if mobile terminal 102 only reads MCCH messages when an MCCH change notification indicates an MCCH change, mobile terminal 102 may continue to utilize the expired MCCH information until a subsequently occurring MCCH change notification indicates another MCCH change, at which point mobile terminal 102 may read an MCCH message during the next MCCH modification period.

Figure 6:
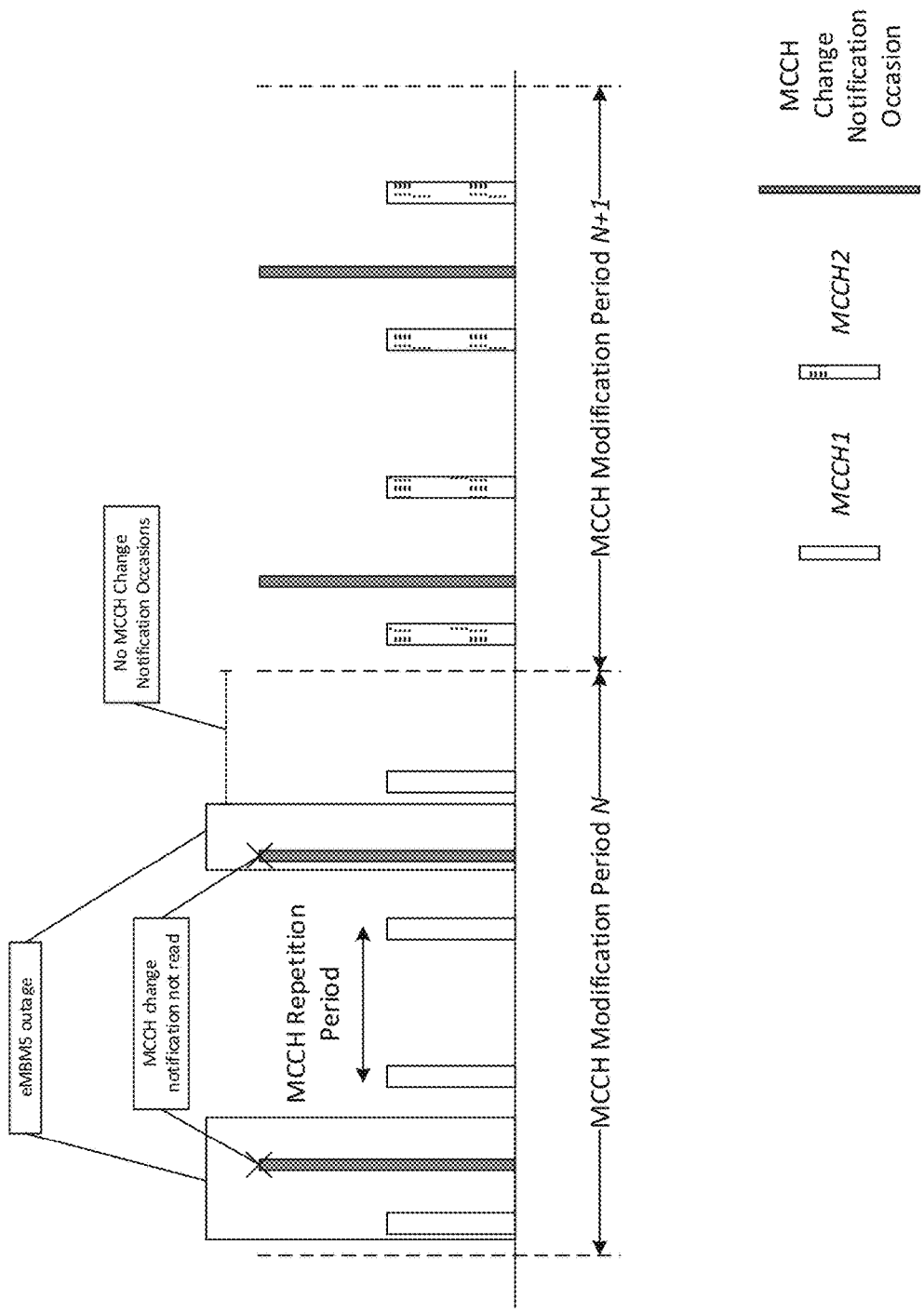
FIG. 6 shows a timing diagram for multicast data according to a third exemplary scenario.

FIG. 6 shows a similar scenario in which mobile terminal 102 may fail to obtain updated MCCH information. In the exemplary scenario of FIG. 6, MBSFN Area 0 MTCH may be inactive, and accordingly mobile terminal 102 may only read MCCH messages in MCCH modification periods following reception of an MCCH change notification indicating an upcoming MCCH change.

However, mobile terminal 102 may experience eMBMS outage during all of the MCCH change notification instances of MCCH modification period N, and accordingly may not be able to read any MCCH change notifications during MCCH modification period N. Accordingly, while the MCCH change notifications of MCCH modification period N may indicate an MBSFN Area 0 MCCH change for MCCH modification period N+1, mobile terminal 102 may not be able to read the MCCH change notifications due to the eMBMS outage. Accordingly, mobile terminal 102 may not be aware of the MCCH change in MCCH modification period N+1, and accordingly may continue to read MCCH change notifications in MCCH modification period N+1 (e.g. applying to potential MCCH changes in MCCH modification period N+2) without reading updated MCCH information MCCH2. Accordingly, mobile terminal 102 may be left with expired MCCH information MCCH1 for MCCH modification period N+1 and any subsequent MCCH modification periods until another MCCH change occurs.

The eMBMS outage may be caused by a variety of factors, including radio link failure, measurement conflicts, or other communication conflicts. For example, mobile terminal 102 may experience radio link failure, thereby missing the MCCH change notification instances in MCCH modification period N. Alternatively, mobile terminal 102 may need to perform inter-frequency or inter-RAT (Radio Access Technology) measurements, such as in accordance with a Discontinuous Reception (DRX) cycle or measurement gap pattern, and accordingly may need to dedicate wireless reception resources to reception on other frequencies and/or RATs, thereby preventing eMBMS reception on the wireless resources utilized for the first eMBMS stream. Many further such scenarios may occur that result in eMBMS outage, and may similarly result in a scenario similar to the scenario depicted in FIG. 6.

Figure 7:
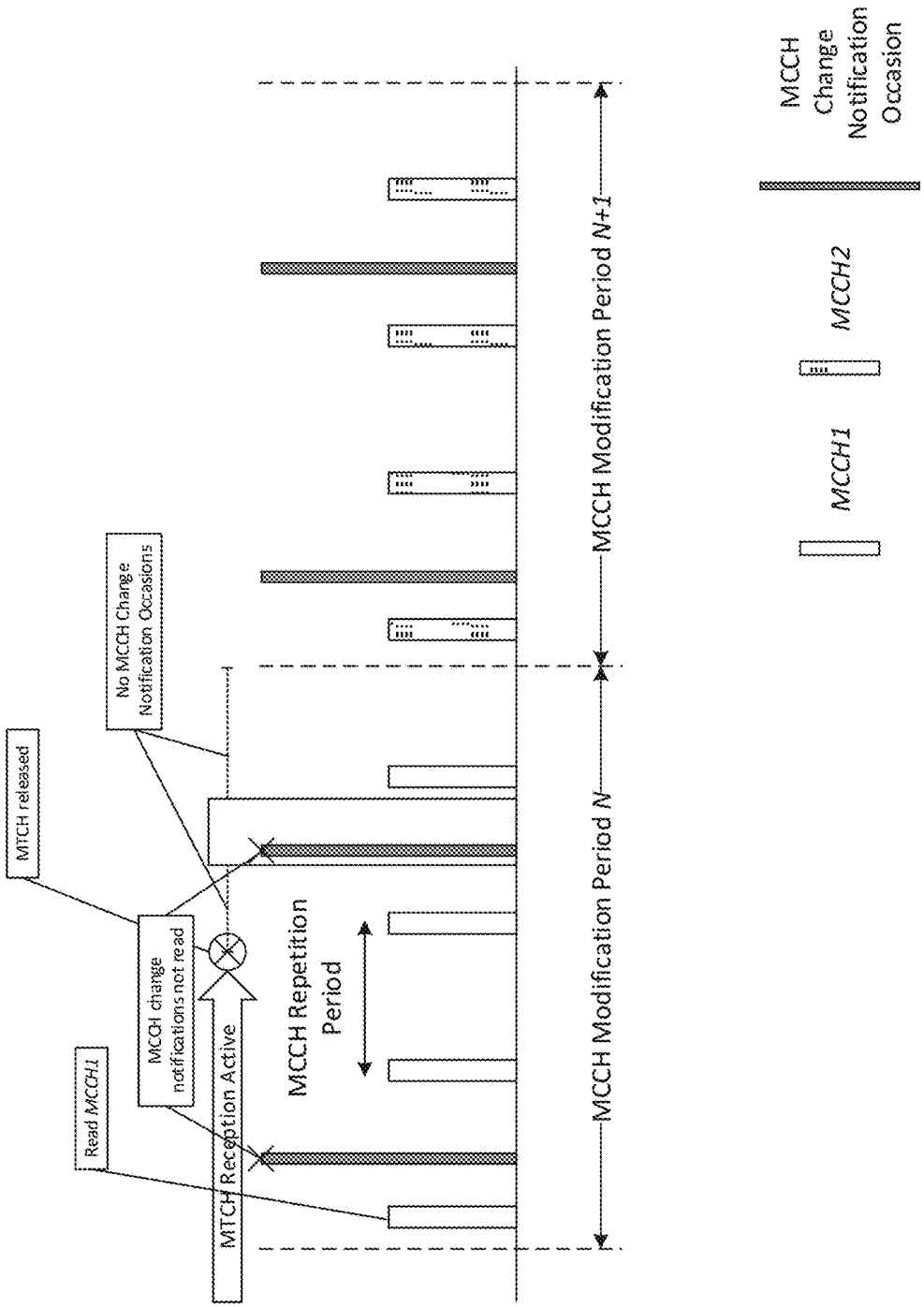
FIG. 7 shows a timing diagram for multicast data according to a fourth exemplary scenario.

Further scenarios may occur in which all MCCH change notification instances are missed during a given MCCH modification period, which may thus leave mobile terminal 102 with expired MCCH information. For example, a combination of the scenarios described in FIGS. 5 and 6 may occur, in which MTCH reception is released following one or more MCCH change notification instances and eMBMS service outage causes subsequent MCCH change notification instances to also be missed. Such a scenario is illustrated in FIG. 7. Many such variations caused by a variety of different factors are possible.

Accordingly, in order to ensure up-to-date MCCH information is maintained, mobile terminal 102 may be configured to ascertain whether all MCCH change notification instances during a given MCCH modification period were missed, i.e. whether no MCCH change notifications were successfully received during a given MCCH modification period. Such a case may arise as a result of any of the scenarios detailed above, i.e. MTCH release and/or eMBMS outage. If all MCCH change notification instances of the given MCCH modification period are missed, mobile terminal 102 may read MCCH data (i.e. an MCCH message occurring in accordance with the MCCH repetition period) during a subsequently occurring MCCH modification period, which may be e.g. the MCCH modification period immediately following the given MCCH modification period. Mobile terminal 102 may therefore avoid scenarios in which updated MCCH information is missed, such as detailed above regarding FIGS. 5-7.

Figure 8:
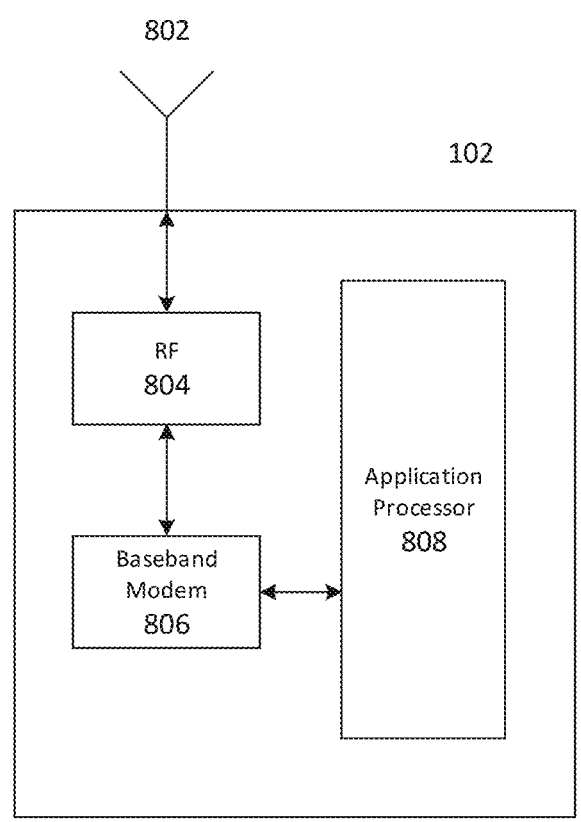
FIG. 8 shows a block diagram illustrating an internal configuration of a mobile terminal.

FIG. 8 shows a block diagram illustrating an internal configuration of mobile terminal 102 according to an aspect of the disclosure. Mobile terminal 102 may be configured to ascertain if one or more MCCH change notification instances were missed during a given MCCH modification period; and, if one or more MCCH change notification instances were missed, receive MCCH control data during a subsequent MCCH modification period occurring after the given MCCH modification period.

As illustrated in FIG. 8, mobile terminal 102 may include antenna 802, radio frequency (RF) transceiver 804, baseband modem 806, and application processor 808. As shown in FIG. 8, the aforementioned components of mobile terminal 102 may be implemented as separate components. However, it is appreciated that the configuration of mobile terminal 102 depicted in FIG. 8 is for purposes of explanation, and accordingly one or more of the aforementioned components of mobile terminal 102 may be integrated into a single equivalent component or divided into two separate components with collective equivalence. It is understood that mobile terminal 102 may have one or more additional components, such as additional hardware, software, or firmware elements. For example, mobile terminal 102 may further include various additional components including hardware, firmware, processors, microprocessors, memory, and other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 102, in particular, RF transceiver 804, baseband modem 806, and application processor 808 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in a first exemplary aspect of the disclosure mobile terminal 102 may be a mobile terminal device having a radio processing circuit (RF transceiver 804) and a baseband processing circuit (baseband modem 806) adapted to interact with the radio processing circuit. Mobile terminal 102 may be configured to identify one or more multicast control data notification messages available for reception during a first multicast control data window, determine whether any of the one or more multicast control data notification messages are not received during the first multicast control data window, and trigger receiving of multicast control data of a second multicast control data window when a predefined quantity of the one or more multicast control data notification messages are not received during the first multicast control data window.

In a second exemplary aspect of the disclosure, mobile terminal 102 may be a mobile terminal device having a radio processing circuit (RF transceiver 804) and a baseband processing circuit (baseband modem 806) adapted to interact with the radio processing circuit. Mobile terminal 102 may be configured to identify one or more Multicast Control Channel (MCCH) change notification messages available for reception during a first MCCH modification period, determine whether any of the one or more MCCH change notification messages are not received during the first MCCH modification period, and receive MCCH data of a second MCCH modification period when none of the one or more MCCH change notification messages are received during the first MCCH modification period.

In an abridged overview of the operation of mobile terminal 102, mobile terminal 102 may be configured to receive and/or transmit wireless signals according to multiple different wireless access protocols or radio access technologies (RATS), including any one of, or any combination of, LTE (Long Term Evolution), WLAN (wireless local network), WiFi, UNTIES (Universal Mobile Telecommunications System), GSM (Global System for Mobile Communications), Bluetooth, CDMA (Code Division Multiple Access), Wideband CDMA (W-CDMA), etc. It is appreciated that separate components may be provided for each distinct type of compatible wireless signals, such as a dedicated LTE antenna, RF transceiver, and baseband modem for LTE reception and transmission and a dedicated WiFi antenna, RF transceiver, and baseband modem for WiFI reception and transmission. Alternatively, one or more components of mobile terminal 102 may be shared between different wireless access protocols, such as e.g. by sharing antenna 802 between multiple different wireless access protocols. In an exemplary aspect of disclosure, RF transceiver 804 and/or baseband modem 806 may be operate according to multiple mobile communication access protocols (i.e. "multi-mode"), and thus may be configured to support one or more of LTE. UMTS, and/or GSM access protocols.

Further according to the abridged overview, RF transceiver 804 may receive radio frequency wireless signals via antenna 802, which may be implemented as e.g. a single antenna or an antenna array composed of multiple antennas. RF transceiver 804 may include various reception circuitry elements, which may be e.g. analog circuitry, configured to process externally received signals, such as mixing circuitry to convert externally received RF signals to baseband and/or intermediate frequencies. RF transceiver 804 may also include amplification circuitry to amplify externally received signals, such as power amplifiers (PAs) and/or Low Noise Amplifiers (LNAs), although it is appreciated that such components may also be implemented separately. RF transceiver 804 may additionally include various transmission circuitry elements configured to transmit internally received signals, such as e.g. baseband and/or intermediate frequency signals provided by baseband modem 806, which may include mixing circuitry to module internally received signals onto one or more radio frequency carrier waves and/or amplification circuitry to amplify internally received signals before transmission. RF transceiver 804 may provide such signals to antenna 802 for wireless transmission. Although not explicitly depicted in FIG. 8, RF transceiver 804 may be additionally be connected to application processor 808.

Figure 9:
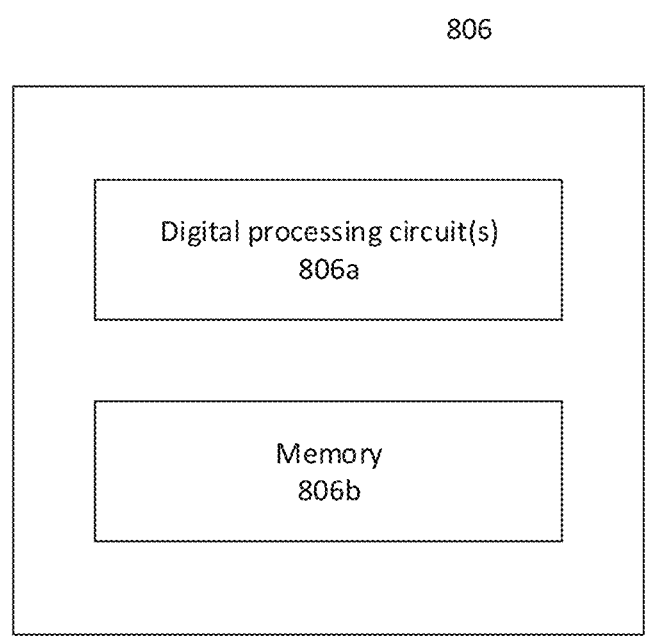
FIG. 9 shows a block diagram illustrating an internal configuration of a mobile baseband modem.

FIG. 9 shows a block diagram illustrating an internal configuration of baseband modem 806 according to an aspect of the disclosure. Baseband modem 806 may include digital processing circuit(s) 806*a* (i.e. one or more digital processing circuits) and baseband memory 806*b*. Although not explicitly shown in FIG. 4, baseband modem 806 may contain one or more additional components, including one or more analog circuits.

Digital processing circuit(s) 806*a* may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 806*a* may include hardware, software, or a combination of hardware and software. Specifically, digital processing circuit(s) 806*a* of baseband modem 806 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 806 may be detailed herein substantially in terms of functional operation in recognition that a person of skill in the art may readily appreciate the various possible structural realizations of baseband modem 806 using digital processing circuitry that will provide the desired functionality.

Baseband memory 806*b* may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 806*b* may be configured to store software elements, which may be retrieved and executed using a processor component of digital processing circuitry 806a. Although depicted as a single component in FIG. 8, baseband memory 806b may be implemented as one or more separate components in baseband modem 806. Baseband memory 806b may also be partially or fully integrated with digital processing circuitry 806a.

Baseband modem 806 be configured to operate one or more protocol stacks, such as a GSM protocol stack, a UMTS protocol stack, an LTE protocol stack, etc. Baseband modem 806 may be "multimode" and may thus be configured to operate in accordance with multiple RATs by executing multiple protocol stack instances simultaneously. Digital processing circuit(s) 806a may therefore include a processor configured to execute program code in accordance with the protocol stacks of each associated RAT. Baseband memory 806a may be configured to store the aforementioned program code. Although not explicitly depicted in FIG. 8, baseband modem 806 may be configured to control one or more further components of UE 100, in particular one or more microphones and/or speakers, such as by providing output audio signals to one or more speakers and/or receiving input audio signals from one or more microphones.

The protocol stack(s) of baseband modem 806 may be configured to control operation of baseband modem 806, such as in order to transmit and receive mobile in accordance with the corresponding RAT(s).

As will be detailed, in a first exemplary aspect of the disclosure baseband modem 806 may include digital processing circuitry (digital processing circuit 806a) and a memory (baseband memory 806b). Baseband modem 806 may be configured to identify one or more multicast control data notification messages available for reception during a first multicast control data window, wherein the one or more multicast control data notification messages indicate whether multicast control data will be updated in a subsequent multicast control data window occurring after the first multicast control data window, determine whether any of the one or more multicast control data notification messages are not received during the first multicast control data window, and receive multicast control data of a second multicast control data window when a predefined quantity of the one or more multicast control data notification messages are not received during the first multicast control data window.

In a second exemplary aspect of the disclosure, baseband modem 806 may include digital processing circuitry (digital processing circuit 806a) and a memory (baseband memory 806b). Baseband modem 806 may be configured to identify one or more Multicast Control Channel (MCCH) change notification messages available for reception during a first MCCH modification period, determine whether any of the one or more MCCH change notification messages are not received during the first MCCH modification period, and receive MCCH data of a second MCCH modification period when none of the one or more MCCH change notification messages are received during the first MCCH modification period.

Application processor 808 may be implemented as a Central Processing Unit (CPU), and may function as a controller for mobile terminal 102. Application processor 808 may be configured to execute various applications and/or programs of mobile terminal 102, such as e.g. applications corresponding to program code stored in a memory component of mobile terminal 102 (not explicitly shown in FIG. 8). Application processor 808 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc.

Although baseband modem 806 and application processor 808 are depicted separately in FIG. 8, it is appreciated that this illustration is not limiting in nature. Accordingly, it is understood that baseband modem 806 and application processor 808 may be implemented separately, implemented together (i.e. as an integrated unit), partially implemented together, etc.

The operation detailed herein to resolve the problematic scenarios of FIGS. 5-7 may be implemented by baseband modem 806, i.e. by digital processing circuit(s) 806a. Accordingly, baseband modem 806 may be configured to ascertain if one or more MCCH change notification instances were missed during a given MCCH modification period; and, if one or more MCCH change notification instances were missed, receive MCCH control data during a subsequent MCCH modification period occurring after the given MCCH modification period.

Figure 10:
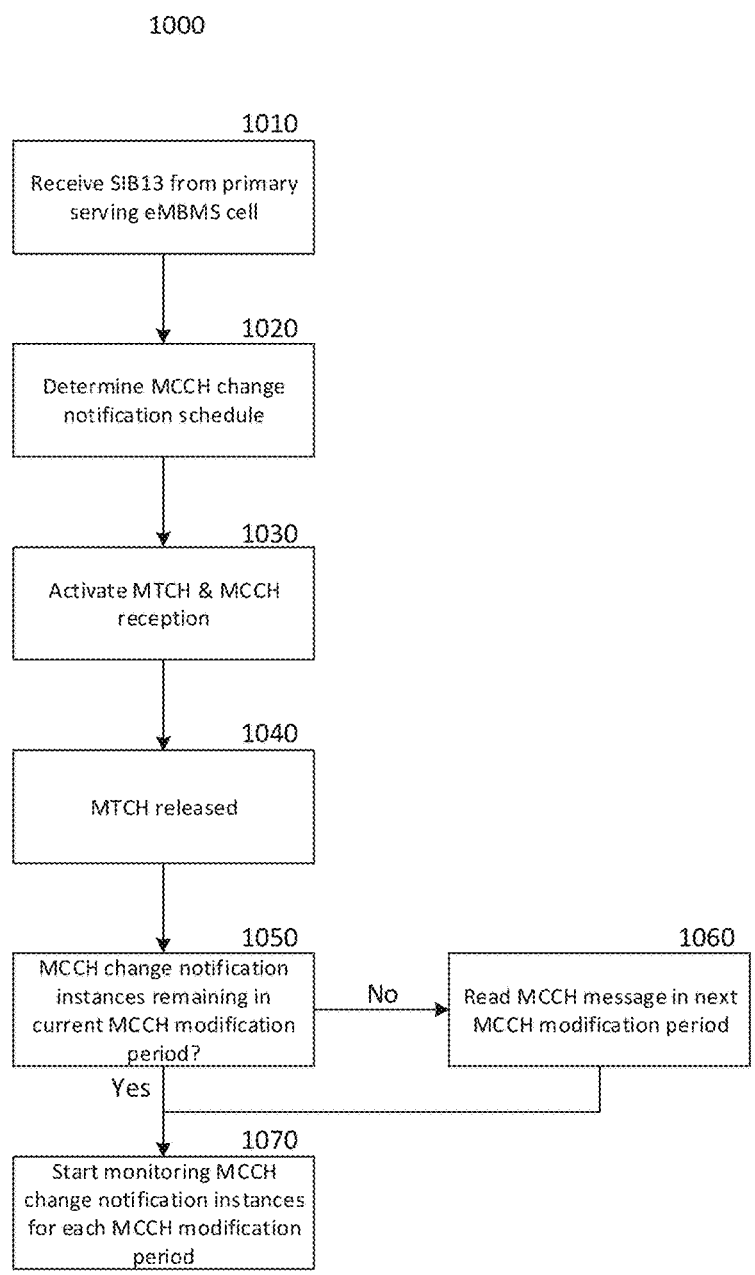
FIG. 10 shows a flow chart illustrating a method for receiving evolved Multimedia Broadcast Multicast Services (eMBMS) data according to a first exemplary aspect of the disclosure.
Figure 11:
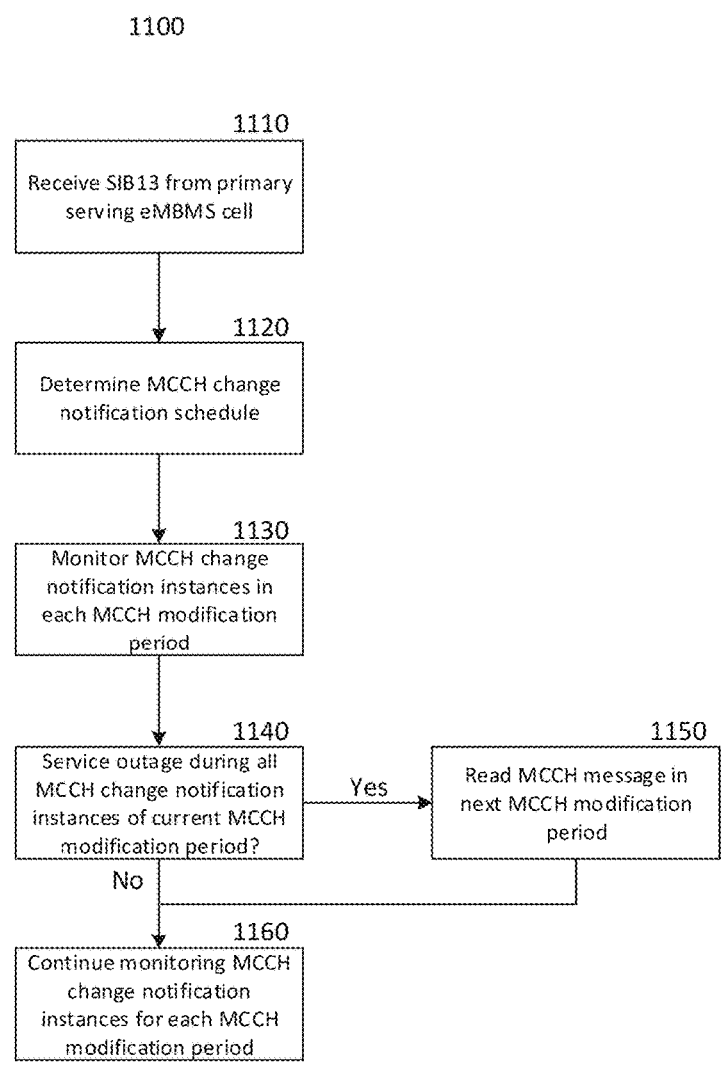
FIG. 11 shows a flow chart illustrating a method for receiving eMBMS data according to a second exemplary aspect of the disclosure.

The operation of baseband modem 806 may be further detailed in reference to FIG. 10 and FIG. 11.

FIG. 10 shows a flow chart illustrating method 1000 for receiving MCCH data at baseband modem 806. Baseband modem 806 may implement method 1000 in certain use cases, such as e.g. the scenario of FIG. 5, and may implement method 1000 under the control of a protocol stack, such as e.g. an LTE protocol stack executed by digital processing circuit(s) 806a.

Baseband modem 806 may in 1010 receive SIB13 from the primary eMBMS serving cell, e.g. a serving cell located at base station 108 as depicted in FIG. 1. Mobile terminal 102 may desire to receive an eMBMS stream, such as e.g. a first eMBMS stream, corresponding to a particular MBSFN Area, such e.g. MBSFN Area 0.

Baseband modem 806 may then ascertain the MCCH scheduling information from the Information Elements (IE) contained in the SIB13 message for MBSFN Area 0. Specifically, baseband modem 806 may ascertain the MCCH repetition period, MCCH offset, and MCCH modification period from the respective IEs mcch-RepetitionPeriod-r9, mcch-Offset-r9, and mcch-ModificationPeriod-r9 (e.g. as specified in 3GPP LTE Release 9). Baseband modem 806 may thus ascertain the MCCH scheduling information, which may be deterministic, i.e. predictable, according to the periodicity and offset specified by the SIB13 message.

Baseband modem 806 may also ascertain the MCCH change notification scheduling information from the SIB13 message. As shown below, baseband modem 806 may read the MBMS-Notification-Config-r9 in order to ascertain the number of MCCH change notification instance repetitions per MCCH modification period (e.g. two or four), the MCCH change notification offset, and MCCH notification subframe index from the respective IEs notificationRepetitionCoeff-r9, notificationOffset-r9, and notificationSF-Index-r9.

```
MBMS-NotificationConfig-r9 ::= SEQUENCE {
    notificationRepetitionCoeff-r9      ENUMERATED {n2, n4},
    notificationOffset-r9       INTEGER (0..10),
    notificationSF-Index-r9 INTEGER (1..6)
}
```

Accordingly, baseband modem 806 may determine in 1020 the specific scheduling, i.e. the timing locations of MCCH change notification instances, during each MCCH modification period.

Baseband modem 806 may in 1030 therefore configure MCCH reception, and may subsequently configure MTCH reception of the first eMBMS stream based on the MTCH scheduling information (i.e. CSA, MSP, MSI, etc.) contained in MCCH messages.

After performing MTCH reception, e.g. for an arbitrary duration, the MBSFN Area 0 MTCH may be released, i.e. may be terminated, thereby becoming inactive in 1040. Such a case is illustrated in FIG. 5.

Accordingly, as MTCH was initially configured during the current MCCH modification period (i.e. any arbitrary MCCH modification period during which the MBSFN Area 0 MTCH was released), baseband modem 806 may not have read any MCCH change notifications, as baseband modem 806 may have instead received at least one MCCH message during each MCCH modification period. Accordingly, baseband modem 806 may not be aware as to whether the MBSFN Area 0 MCCH will undergo a change during the next MCCH modification period.

Baseband modem 806 may therefore determine in 1050 whether any MCCH change notification instances are remaining in the current MCCH modification period, such as by identifying if any MCCH change notifications instances are remaining in the current MCCH modification period according to the MCCH change notification period, offset, and subframe index (i.e. scheduling information) provided in the SIB13 message.

If baseband modem 806 ascertains that there are MCCH change notification instances remaining in the current MCCH modification period, baseband modem 806 may begin monitoring MCCH change notifications in each MCCH modification period in 1070, and accordingly may read the remaining MCCH change notification instances in the current MCCH modification period in addition to MCCH change notification instances in subsequent MCCH modification periods in order to identify any upcoming MCCH changes.

However, if no MCCH change notification instances are remaining in the current MCCH modification period, baseband modem 806 may read an MCCH message in a subsequent MCCH modification period in 1060, e.g. the immediately following MCCH modification period (e.g. if possible) or a subsequent MCCH modification period, in order to obtain the MCCH information (i.e. the MBSFN Area Configuration message) contained therein. Baseband modem 806 may select to read e.g. any MCCH message in a subsequent MCCH modification period, such as e.g. the first MCCH message, second MCCH message, etc.; however, it may be advantageous for baseband modem to select to read the first MCCH message in the immediately following MCCH modification period. Baseband modem 806 may therefore maintain up-to-date MCCH information, and may not be susceptible to expired MCCH information. Baseband modem 806 may then begin monitoring MCCH change notification instances in 1070 for each following MCCH modification period, and subsequently following the information in each MCCH change notification to maintain updated MCCH information.

FIG. 11 shows a flow chart illustrating method 1100 for receiving MCCH data at baseband modem 806. Baseband modem 806 may implement method 1100 in certain use cases, such as e.g. the scenario of FIG. 6, and may implement method 1100 under the control of a protocol stack, such as e.g. an LTE protocol stack executed by digital processing circuit(s) 806a.

Baseband modem 806 may perform 1110 and 1120 in a substantially similar manner as to 1010 and 1020, respectively, i.e. by receiving and decoding SIB13 from the primary eMBMS serving cell, i.e. a cell of base station 108 providing a first eMBMS stream.

However, the MBSFN Area 0 MTCH may not be configured, i.e. may be inactive (or e.g. may alternatively be configured at an earlier time and subsequently be released), and accordingly baseband modem 806 may monitor MCCH change notification instances during each MCCH modification period in 1130. As the MTCH is not active, baseband modem 806 may not read MCCH messages during each MCCH modification period unless a preceding MCCH change notification indicates an upcoming MCCH change.

Baseband modem 806 may detect an eMBMS outage in 1140 that occurs during all MCCH change notification instances of the current MCCH modification period, such as e.g. due to measurements, radio link failure, other conflicts, etc. If such a case occurs, baseband modem 1160 may not be aware of an upcoming MCCH change in the following MCCH modification period, and accordingly may risk missing update of MCCH information. Baseband modem 806 may accordingly read an MCCH message in a subsequent MCCH modification period in 1060, e.g. the immediately following MCCH modification period (e.g. if possible) or a subsequent MCCH modification period, in order to obtain the MCCH information (i.e. the MBSFN Area Configuration message) contained therein. Baseband modem 806 may select to read e.g. any MCCH message in a subsequent MCCH modification period, such as e.g. the first MCCH message, second MCCH message, etc.; however, it may be advantageous for baseband modem to select to read the first MCCH message in the immediately following MCCH modification period. Baseband modem 806 may therefore maintain up-to-date MCCH information, and may not be susceptible to expired MCCH information. Baseband modem 806 may then begin monitoring MCCH change notification instances in 1070 for each following MCCH modification period, and subsequently following the information in each MCCH change notification to maintain updated MCCH information.

Baseband modem 806 may then continue monitoring MCCH change notification instances for each MCCH modification period in 1160.

Similarly, if there was not a service outage during all MCCH change notification instances of the current MCCH modification period, baseband modem 806 may continue monitoring MCCH change notification instances for each MCCH modification period in 1160.

It is understood that method 1100 may be further configured to detect the scenario of FIG. 7, such as by detecting in 1140 if MTCH reception and/or service outage caused all MCCH change notification instances of the current MCCH modification period to be missed. Further variations are possible to detect a variety of scenarios in which MCCH change notification instances in an MCCH modification period missed.

As previously indicated, service outages may occur due to radio link failure, measurement gaps (i.e. as configured by the mobile communication network by Evolved Radio Resource Control (ERRC), such as e.g. a 6 ms measurement gap every 40 or 80 ms to perform inter-frequency or inter-RAT measurements), DRX cycles, other communication conflicts, etc.

Accordingly, mobile terminal 102 may maintain up-to-date MCCH information for a given eMBMS stream by detecting whether MCCH change notifications during an MCCH modification period were missed, and, if all MCCH change notifications during the MCCH modification period were missed, reading MCCH data during a subsequent MCCH modification period.

Figure 12:
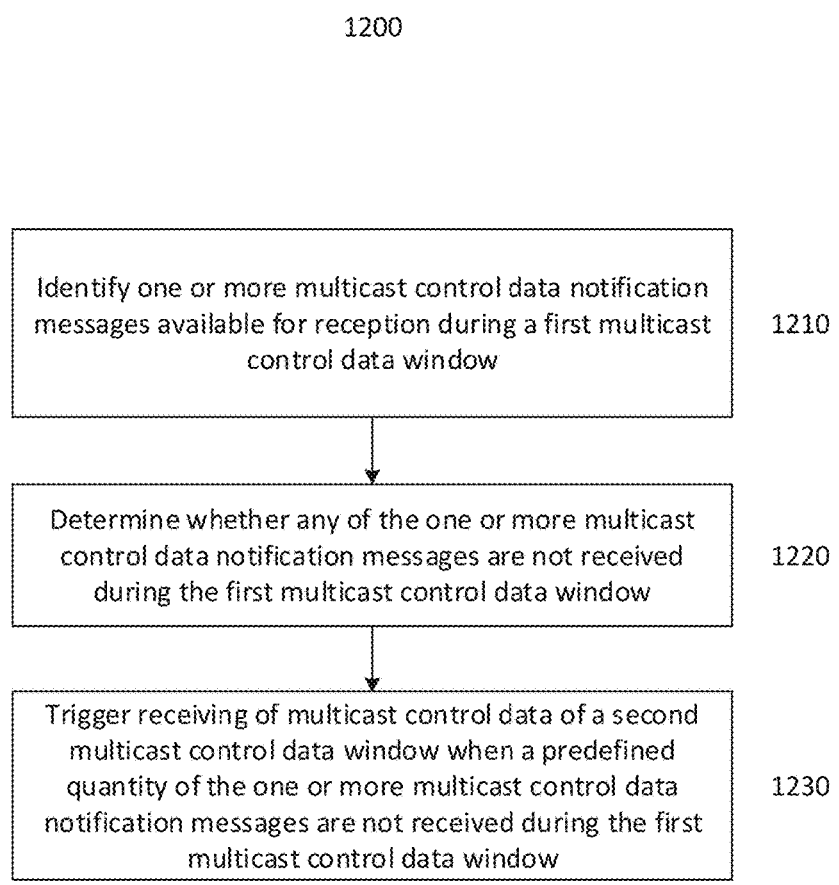
FIG. 12 shows a flow chart illustrating a method for performing mobile communications according to a second first exemplary aspect of the disclosure.

FIG. 12 shows a flow chart illustrating method 1200 for performing mobile communications. Method 1200 includes identifying (1210) one or more multicast control data notification messages available for reception during a first multicast control data window, determining (1220) whether any of the one or more multicast control data notification messages are not received during the first multicast control data window, and triggering receiving (1230) multicast control data of a second multicast control data window when a predefined quantity of the one or more multicast control data notification messages are not received during the first multicast control data window.

In one or more further exemplary aspects of the disclosure, one or more of the features described above in reference to FIGS. 1-11 may be further incorporated into method 1200. In particular, method 1200 may be configured to perform further and/or alternate processes as detailed regarding mobile terminal 102 and/or baseband modem 806.

Figure 13:
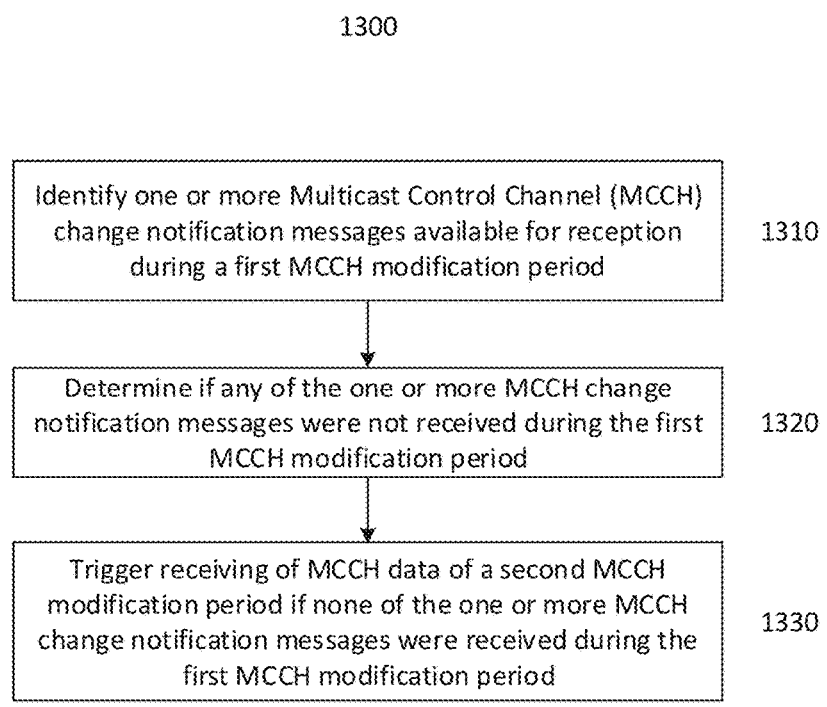
FIG. 13 shows a flow chart illustrating a method for performing mobile communications according to a second exemplary aspect of the disclosure.

FIG. 13 shows a flow chart illustrating method 1300 for performing mobile communications. Method 1300 includes identifying (1310) one or more Multicast Control Channel (MCCH) change notification messages available for reception during a first MCCH modification period, identifying (1320) whether any of the one or more MCCH change notification messages are not received during the first MCCH modification period, and receiving (1330) MCCH data of a second MCCH modification period when none of the one or more MCCH change notification messages are received during the first MCCH modification period.

In one or more further exemplary aspects of the disclosure, one or more of the features described above in reference to FIGS. 1-11 may be further incorporated into method 1300. In particular, method 1300 may be configured to perform further and/or alternate processes as detailed regarding mobile terminal 102 and/or baseband modem 806.

The above description is understood to address multiple scenarios in which reception of MCCH change notifications is missed. It is appreciated that while several exemplary scenarios have been explicitly detailed, the procedures and implementations of this disclosure may be applied to substantially all scenarios in which reception of MCCH change notifications is missed.

It is appreciated that the terms "user equipment", "UE", "mobile terminal", etc., may apply to any wireless communication device, including cellular phones, tablets, laptops, personal computers, and any number of additional electronic devices.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of this disclosure:

Example 1 is a method of performing mobile communications. The method includes identifying one or more multicast control data notification messages available for reception during a first multicast control data window, determining whether any of the one or more multicast control data notification messages are not received during the first multicast control data window, and triggering receiving of multicast control data of a second multicast control data window when a predefined quantity of the one or more multicast control data notification messages are not received during the first multicast control data window.

In Example 2, the subject matter of Example 1 can optionally include wherein the one or more multicast control data notification messages indicate whether multicast control data will be updated in a subsequent multicast control data window occurring after the first multicast control data window, In Example 3, the subject matter of Example 1 or 2 can optionally further include skipping receiving of the multicast control data of the second multicast control data window when the at least the predefined quantity of the one or more multicast control data notification messages are received during the first multicast control data window and wherein at least one of the one or more multicast control data notification message indicates that the multicast control data of the second multicast control data window is equivalent to multicast control data of the first multicast data window.

In Example 4, the subject matter of Example 3 can optionally further include triggering receiving of at least one of the one or more multicast control data notification messages, and identifying whether the at least one multicast control data change notification message indicates that the multicast control data of the second multicast control data window is different from the multicast control data of the first multicast control data window.

In Example 5, the subject matter of Example 1 or 2 can optionally further include skipping receiving of all multicast control data of the second multicast control data window when at least one of the one or more multicast control data notification messages was received during the first multicast control data window and wherein the at least one of the one or more multicast control data notification message indicates that multicast control data of the second multicast control data window is equivalent to multicast control data of the first multicast data window.

In Example 6, the subject matter of Example 1 or 2 can optionally include wherein the identifying one or more multicast control data notification messages scheduled for reception during a first multicast control data window includes triggering receiving of system information derived from a mobile communication network that indicates a reception timing schedule for the set of multicast control data messages.

In Example 7, the subject matter of Example 6 can optionally include wherein the system information is a System Information Block Type 13 (SIB13) message according to a Long Term Evolution (LTE) configuration.

In Example 8, the subject matter of Example 6 can optionally include wherein the determining whether any of the one or more multicast control data notification messages are not received during the first multicast control data window includes determining whether any of the one or more multicast control data notification messages are not received during the first multicast control data window using the reception timing schedule.

In Example 9, the subject matter of Example 1 or 2 can optionally include wherein the determining whether any of the one or more multicast control data notification messages are not received during the first multicast control data window includes determining whether none of the one or more multicast control data notification messages are received during the first multicast control data window.

In Example 10, the subject matter of Example 9 can optionally include wherein the triggering receiving of multicast control data of a second multicast control data window when a predefined quantity of the one or more multicast control data notification messages are not received during the first multicast control data window includes triggering receiving of the multicast control data of the second multicast control data window when none of the one or more multicast control data notification messages are received during the first multicast control data window.

In Example 11, the subject matter of Example 1 or 2 can optionally include wherein the determining whether any of the one or more multicast control data notification messages are not received during the first multicast control data window includes identifying whether receiving of multicast user data traffic was terminated during the first multicast control data window.

In Example 12, the subject matter of Example 1 or 2 can optionally further include identifying a final multicast control data notification message that is the last occurring multicast control data notification message of the one or more multicast control data notification messages in time, and wherein the determining whether any of the one or more multicast control data notification messages are not received during the first multicast control data window includes identifying whether receiving of multicast user data traffic was terminated after the final multicast control data notification message was available for reception during the first multicast control data window.

In Example 13, the subject matter of Example 1 or 2 can optionally include wherein the determining whether any of the one or more multicast control data notification messages are not received during the first multicast control data window includes identifying whether one or more multicast service reception outages occurred during the first multicast control data window.

In Example 14, the subject matter of Example 13 can optionally include wherein the identifying whether one or more multicast service reception outages occurred during the first multicast control data window includes identifying whether a radio measurement caused a multicast service outage during the first multicast control data window.

In Example 15, the subject matter of Example 13 can optionally include wherein the identifying whether one or more multicast service reception outages occurred during the first multicast control data window includes identifying whether radio link failure caused a multicast service outage during the first multicast control data window.

In Example 16, the subject matter of Example 13 can optionally include wherein the identifying whether one or more multicast service reception outages occurred during the first multicast control data window includes identifying whether reception conflict caused a multicast service outage during the first multicast control data window.

In Example 17, the subject matter of any one of Examples 1 to 16 can optionally include wherein the one or more multicast control data notification messages indicate whether multicast control data will be updated in the multicast control data window immediately following the first multicast control data window, and wherein the second multicast control data window is the multicast control data window immediately following the first multicast control data window.

In Example 18, the subject matter of any one of Examples 1 to 17 can optionally include wherein the first multicast control data window contains a predefined number of multicast control data notification messages, and wherein the one or more multicast control data notification messages include all of the predefined number of multicast control data notification messages.

In Example 19, the subject matter of Example 18 can optionally include wherein the predefined number of multicast control data notification messages are scheduled to occur according to a predefined period within the first multicast control data window.

In Example 20, the subject matter of Example 19 can optionally further include trigger receiving of system information that indicates the predefined period.

In Example 21, the subject matter of Example 20 can optionally include wherein the system information is a System Information Block Type 13 (SIB13) message according to a Long Term Evolution (LTE) configuration.

In Example 22, the subject matter of any one of Examples 1 to 21 can optionally include wherein the multicast control data of the second multicast control data window is scheduled to occur periodically during the second multicast control data window according to a multicast control data repetition period.

In Example 23, the subject matter of Example 22 can optionally include wherein the multicast control data reception data period is a Multicast Control Channel (MCCH) repetition period.

In Example 24, the subject matter of Example 22 can optionally further include triggering receiving of system information from a mobile communication network that indicates the multicast control data repetition period.

In Example 25, the subject matter of Example 1 or 2 can optionally include wherein the determining whether any of the one or more multicast control data notification messages are not received during the first multicast control data window includes identifying whether one or more multicast service reception outages occurred during the available reception times of all of the one or more multicast control data notification messages during the first multicast control data window.

In Example 26, the subject matter of Example 1 or 2 can optionally further include triggering receiving of multicast user data traffic during at least part of the first multicast control data window, terminating receiving of the multicast user data traffic during the first multicast control data window, and wherein the determining whether any of the one or more multicast control data notification messages are not received during the first multicast control data window includes identifying whether the reception termination of the multicast user data traffic caused receiving of all of the one or more multicast control data notification messages to be missed during the first multicast control data window.

In Example 27, the subject matter of Example 1 or 2 can optionally further include triggering receiving of multicast user data traffic during at least part of the first multicast control data window, terminating receiving of the multicast user data traffic at a termination time point in the first multicast control data window, and wherein the determining whether any of the one or more multicast control data change notification messages are not received during the first multicast control data window includes identifying whether the termination time point temporally occurred after all of the one or more multicast control data change notification messages are available to be received during the first multicast control data window.

In Example 28, the subject matter of Example 1 or 2 can optionally include wherein the determining whether any of the one or more multicast control data notification messages are not received during the first multicast control data window includes determining whether any of the one or more multicast control data notification messages are not received during the first multicast control data window using a predefined timing schedule of the available reception times of the one or more multicast control data notification messages.

In Example 29, the subject matter of Example 28 can optionally further include triggering receiving of system information from a mobile communication network, and identifying the predefined timing schedule using the system information.

In Example 30, the subject matter of Example 28 can optionally further include identifying the predefined timing schedule using received system information that indicates a periodicity of the one or more multicast control data notification messages and a quantity of the one or more multicast control data notification messages.

In Example 31, the subject matter of any one of Examples 1 to 25 can optionally further include triggering receiving of multicast user data traffic during the first multicast control data window.

In Example 32, the subject matter of any one of Examples 1 to 31 can optionally include wherein the one or more multicast control data notification messages indicate whether multicast control data will be updated in the multicast control data window immediately following the first multicast control data window.

In Example 33, the subject matter of any one of Examples 1 to 32 can optionally include wherein the second multicast control data window is the multicast control data window immediately following the first multicast control data window.

In Example 34, the subject matter of any one of Examples 1 to 33 can optionally include wherein the one or more multicast control data notification messages are Multicast Control Channel (MCCH) change notification messages, the first multicast control data window and the second multicast control data window are MCCH modification periods, and the multicast control data is MCCH data.

Example 35 is a method of performing mobile communications. The method includes identifying one or more Multicast Control Channel (MCCH) change notification messages available for reception during a first MCCH modification period, determining whether any of the one or more MCCH change notification messages are not received during the first MCCH modification period, and triggering receiving of MCCH data of a second MCCH modification period when none of the one or more MCCH change notification messages are received during the first MCCH modification period.

In Example 36, the subject matter of Example 35 can optionally further include skipping receiving of MCCH data of the second MCCH modification period when at least one of the one or more MCCH change notification messages was received during the first MCCH modification period and wherein the at least one MCCH change notification indicates that the MCCH data of the second MCCH modification period is equivalent to MCCH data of the first MCCH modification period.

In Example 37, the subject matter of Example 36 can optionally further include triggering receiving of at least one of the one or more MCCH change notification messages, and identifying whether the at least one MCCH change notification message indicates that the MCCH data of the second MCCH modification period is different from the MCCH data of the first MCCH modification period.

In Example 38, the subject matter of Example 35 can optionally include wherein the identifying one or more MCCH change notification messages available for reception during a first MCCH modification period includes triggering receiving of system information derived from a mobile communication network that indicates a reception timing schedule for the one or more MCCH change notification messages.

In Example 39, the subject matter of Example 38 can optionally include wherein the system information is a System Information Block Type 13 (SIB13) message according to a Long Term Evolution (LTE) configuration.

In Example 40, the subject matter of Example 38 can optionally further include ascertaining the reception timing schedule based on an MCCH change notification message repetition coefficient and an MCCH change notification message offset included in the system information.

In Example 41, the subject matter of Example 38 can optionally include wherein the determining whether any one of the one or more MCCH change notification messages are not received during the first MCCH modification period includes determining whether any one of the one or more MCCH change notification messages are not received during the first MCCH modification period using the reception timing schedule.

In Example 42, the subject matter of Example 35 can optionally include wherein the determining whether any one of the one or more MCCH change notification messages are not received during the first MCCH modification period includes determining whether none of the one or more MCCH change notification messages are received during the first MCCH modification period.

In Example 43, the subject matter of Example 35 can optionally further include identifying a final MCCH change notification message that is the last occurring MCCH change notification message of the one or more MCCH change notification messages in time, and wherein the determining whether any of the one or more MCCH change notification messages are not received during the first MCCH modification period includes identifying whether receiving of Multicast Traffic Channel (MTCH) data was terminated after the final MCCH change notification message was available for reception during the first MCCH modification period.

In Example 44, the subject matter of Example 43 can optionally include wherein the determining whether any of the one or more MCCH change notification messages are not received during the first MCCH modification period includes identifying whether one or more evolved Multimedia Broadcast Multicast Service (eMBMS) reception outages occurred during the first MCCH modification period.

In Example 45, the subject matter of Example 44 can optionally include wherein the identifying whether one or more eMBMS reception outages occurred during the first MCCH modification period includes identifying whether a radio measurement caused an eMBMS reception outage during the first MCCH modification period.

In Example 46, the subject matter of Example 44 can optionally include wherein the identifying whether one or more eMBMS reception outages occurred during the first MCCH modification period includes identifying whether radio link failure caused an eMBMS reception outage during the first MCCH modification period.

In Example 47, the subject matter of Example 44 can optionally include wherein the identifying whether one or more eMBMS reception outages occurred during the first MCCH modification period includes identifying whether reception conflict caused an eMBMS reception outage during the first MCCH modification period.

In Example 48, the subject matter of any one of Examples 35 to 47 can optionally include wherein the one or more MCCH change notification messages indicate whether MCCH data will be updated in the MCCH modification period immediately following the first MCCH modification period, and wherein the second MCCH modification period is the MCCH modification period immediately following the first MCCH modification period.

In Example 49, the subject matter of any one of Examples 35 to 48 can optionally include wherein the first MCCH modification period contains a predefined number of MCCH change notification messages, and wherein the one or more MCCH change notification messages include all of the predefined number of MCCH change notification messages.

In Example 50, the subject matter of Example 49 can optionally include wherein the predefined number of MCCH change notification messages are scheduled to occur according to a predefined period within the first MCCH modification period.

In Example 51, the subject matter of Example 50 can optionally further include triggering receiving of system information that indicates the predefined period.

In Example 52, the subject matter of Example 50 can optionally include wherein the system information is a System Information Block Type 13 (SIB13) message according to a Long Term Evolution (LTE) configuration.

In Example 53, the subject matter of any one of Examples 35 to 52 can optionally include wherein the MCCH data of the second MCCH modification period is scheduled to occur periodically during the second MCCH modification period according to an MCCH repetition period.

In Example 54, the subject matter of Example 53 can optionally further include triggering receiving of system information from a mobile communication network that indicates the MCCH repetition period.

In Example 55, the subject matter of Example 54 can optionally include wherein the system information is a System Information Block Type 13 (SIB13) message according to a Long Term Evolution (LTE) configuration.

In Example 56, the subject matter of Example 35 can optionally include wherein the determining whether any of the one or more MCCH change notification messages are not received during the first MCCH modification period includes identifying whether one or more evolved Multimedia Broadcast Multicast Service (eMBMS) reception outages occurred during the available reception times of all of the one or more MCCH change notification messages during the first MCCH modification period.

In Example 57, the subject matter of Example 35 can optionally further include triggering receiving of Multicast Traffic Channel (MTCH) data during at least part of the first MCCH modification period, terminating receiving of the MTCH data during the first MCCH modification period, and wherein the determining whether any of the one or more MCCH change notification messages are not received during the first MCCH modification period includes identifying whether the reception termination of the MTCH data caused receiving of all of the one or more MCCH change notification messages to be missed during the first MCCH modification period.

In Example 58, the subject matter of Example 35 can optionally further include triggering receiving of Multicast Traffic Channel (MTCH) data during at least part of the first MCCH modification period, terminating receiving of the MTCH data at a termination time point in the first MCCH modification period, and wherein the determining whether any of the one or more MCCH change notification messages are not received during the first MCCH modification period includes identifying whether the termination time point temporally occurred after all of the one or more MCCH change notification messages are available to be received during the first MCCH modification period.

In Example 59, the subject matter of Example 35 can optionally include wherein the determining whether any of the one or more MCCH change notification messages are not received during the first MCCH modification period includes determining whether any of the one or more MCCH change notification messages are not received during the first MCCH modification period using a predefined timing schedule of the available reception times of the one or more MCCH change notification messages.

In Example 60, the subject matter of Example 59 can optionally further include triggering receiving of system information from a mobile communication network, and identifying the predefined timing schedule using the system information.

In Example 61, the subject matter of Example 60 can optionally further include identifying the predefined timing schedule using received system information that indicates an MCCH change notification message repetition coefficient and an MCCH change notification message offset.

In Example 62, the subject matter of any one of Examples 35 to 56 can optionally further include triggering receiving of Multicast Traffic Channel (MTCH) data during the first MCCH modification period.

In Example 63, the subject matter of any one of Examples 35 to 62 can optionally include wherein the one or more MCCH change notification messages indicate whether MCCH data will be updated in the MCCH modification period immediately following the first MCCH modification period.

In Example 64, the subject matter of any one of Examples 35 to 63 can optionally include wherein the second MCCH modification period is the MCCH modification period immediately following the first MCCH modification period.

Example 65 is a mobile terminal device having a radio processing circuit and a baseband processing circuit adapted to interact with the radio processing circuit. The baseband processing circuit is configured to identify one or more multicast control data notification messages available for reception during a first multicast control data window, determine whether any of the one or more multicast control data notification messages are not received during the first multicast control data window, and trigger receiving of multicast control data of a second multicast control data window when a predefined quantity of the one or more multicast control data notification messages are not received during the first multicast control data window.

In Example 66, the subject matter of Example 65 can optionally include wherein the one or more multicast control data notification messages indicate whether multicast control data will be updated in a subsequent multicast control data window occurring after the first multicast control data window, In Example 67, the subject matter of Example 65 or 66 can optionally include wherein the radio processing circuit is configured to receive the multicast control data of the second multicast control data window responsive to the baseband processing circuit triggering receiving of the multicast control data of the second multicast control data window, and provide the multicast control data of the second multicast control data window to the baseband processing circuit.

In Example 68, the subject matter of Example 65 or 66 can optionally include wherein the baseband processing circuit is further configured to skip receiving of the multicast control data of the second multicast control data window when the at least the predefined quantity of the one or more multicast control data notification messages are received during the first multicast control data window and wherein at least one of the one or more multicast control data notification message indicates that the multicast control data of the second multicast control data window is equivalent to multicast control data of the first multicast data window.

In Example 69, the subject matter of Example 68 can optionally include wherein the radio processing circuit is configured to skip receiving of the multicast control data of the second multicast control data window responsive to the baseband processing circuit skipping receiving of the multicast control data of the second multicast control data window.

In Example 70, the subject matter of Example 68 can optionally include wherein the baseband processing circuit is further configured to trigger receiving of at least one of the one or more multicast control data notification messages, and identify whether the at least one multicast control data change notification message indicates that the multicast control data of the second multicast control data window is different from the multicast control data of the first multicast control data window.

In Example 71, the subject matter of Example 70 can optionally include wherein the radio processing circuit is configured to receive the at least one of the one or more multicast control data notification messages responsive to the baseband processing circuit triggering receiving of the at least one of the one or more multicast control data notification messages, and provide the at least one of the one or more multicast control data notification messages to the baseband processing circuit.

In Example 72, the subject matter of Example 65 or 66 can optionally include wherein the baseband processing circuit is further configured to skip receiving of all multicast control data of the second multicast control data window when at least one of the one or more multicast control data notification messages was received during the first multicast control data window and wherein the at least one of the one or more multicast control data notification message indicates that multicast control data of the second multicast control data window is equivalent to multicast control data of the first multicast data window.

In Example 73, the subject matter of Example 72 can optionally include wherein the radio processing circuit is configured to skip receiving of all multicast control data of the second multicast control data window responsive to the baseband processing circuit skipping receiving of all multicast control data of the second multicast control data window.

In Example 74, the subject matter of Example 65 or 66 can optionally include wherein the identifying one or more multicast control data notification messages scheduled for reception during a first multicast control data window includes triggering receiving of system information derived from a mobile communication network that indicates a reception timing schedule for the set of multicast control data messages.

In Example 75, the subject matter of Example 74 can optionally include wherein the radio processing circuit is configured to receive the system information responsive to the baseband processing circuit triggering receiving of the system information, and provide the system information to the baseband processing circuit.

In Example 76, the subject matter of Example 74 can optionally include wherein the system information is a System Information Block Type 13 (SIB13) message according to a Long Term Evolution (LTE) configuration.

In Example 77, the subject matter of Example 74 can optionally include wherein the determining whether any of the one or more multicast control data notification messages are not received during the first multicast control data window includes determining whether any of the one or more multicast control data notification messages are not received during the first multicast control data window using the reception timing schedule.

In Example 78, the subject matter of Example 65 or 66 can optionally include wherein the determining whether any of the one or more multicast control data notification messages are not received during the first multicast control data window includes determining whether none of the one or more multicast control data notification messages are received during the first multicast control data window.

In Example 79, the subject matter of Example 78 can optionally include wherein the triggering receiving of multicast control data of a second multicast control data window when a predefined quantity of the one or more multicast control data notification messages are not received during the first multicast control data window includes triggering receiving of the multicast control data of the second multicast control data window when none of the one or more multicast control data notification messages are received during the first multicast control data window.

In Example 80, the subject matter of Example 65 or 66 can optionally include wherein the determining whether any of the one or more multicast control data notification messages are not received during the first multicast control data window includes identifying whether receiving of multicast user data traffic was terminated during the first multicast control data window.

In Example 81, the subject matter of Example 65 or 66 can optionally include wherein the baseband processing circuit is further configured to identify a final multicast control data notification message that is the last occurring multicast control data notification message of the one or more multicast control data notification messages in time, and wherein the determining whether any of the one or more multicast control data notification messages are not received during the first multicast control data window includes identifying whether receiving of multicast user data traffic was terminated after the final multicast control data notification message was available for reception during the first multicast control data window.

In Example 82, the subject matter of Example 65 or 66 can optionally include wherein the determining whether any of the one or more multicast control data notification messages are not received during the first multicast control data window includes identifying whether one or more multicast service reception outages occurred during the first multicast control data window.

In Example 83, the subject matter of Example 82 can optionally include wherein the identifying whether one or more multicast service reception outages occurred during the first multicast control data window includes identifying whether a radio measurement caused a multicast service outage during the first multicast control data window.

In Example 84, the subject matter of Example 82 can optionally include wherein the identifying whether one or more multicast service reception outages occurred during the first multicast control data window includes identifying whether radio link failure caused a multicast service outage during the first multicast control data window.

In Example 85, the subject matter of Example 82 can optionally include wherein the identifying whether one or more multicast service reception outages occurred during the first multicast control data window includes identifying whether reception conflict caused a multicast service outage during the first multicast control data window.

In Example 86, the subject matter of any one of Examples 65 to 85 can optionally include wherein the one or more multicast control data notification messages indicate whether multicast control data will be updated in the multicast control data window immediately following the first multicast control data window, and wherein the second multicast control data window is the multicast control data window immediately following the first multicast control data window.

In Example 87, the subject matter of any one of Examples 65 to 86 can optionally include wherein the first multicast control data window contains a predefined number of multicast control data notification messages, and wherein the one or more multicast control data notification messages include all of the predefined number of multicast control data notification messages.

In Example 88, the subject matter of Example 87 can optionally include wherein the predefined number of multicast control data notification messages are scheduled to occur according to a predefined period within the first multicast control data window.

In Example 89, the subject matter of Example 88 can optionally include wherein the baseband processing circuit is further configured to trigger receiving of system information that indicates the predefined period.

In Example 90, the subject matter of Example 89 can optionally include wherein the system information is a System Information Block Type 13 (SIB13) message according to a Long Term Evolution (LTE) configuration.

In Example 91, the subject matter of any one of Examples 65 to 90 can optionally include wherein the multicast control data of the second multicast control data window is scheduled to occur periodically during the second multicast control data window according to a multicast control data repetition period.

In Example 92, the subject matter of Example 91 can optionally include wherein the multicast control data reception data period is a Multicast Control Channel (MCCH) repetition period.

In Example 93, the subject matter of Example 91 can optionally include wherein the baseband processing circuit is further configured to trigger receiving of system information from a mobile communication network that indicates the multicast control data repetition period.

In Example 94, the subject matter of Example 65 or 66 can optionally include wherein the determining whether any of the one or more multicast control data notification messages are not received during the first multicast control data window includes identifying whether one or more multicast service reception outages occurred during the available reception times of all of the one or more multicast control data notification messages during the first multicast control data window.

In Example 95, the subject matter of Example 65 or 66 can optionally include wherein the baseband processing circuit is further configured to trigger receiving of multicast user data traffic during at least part of the first multicast control data window, terminate receiving of the multicast user data traffic during the first multicast control data window, and wherein the determining whether any of the one or more multicast control data notification messages are not received during the first multicast control data window includes identifying whether the reception termination of the multicast user data traffic caused receiving of all of the one or more multicast control data notification messages to be missed during the first multicast control data window.

In Example 96, the subject matter of Example 65 or 66 can optionally include wherein the baseband processing circuit is further configured to trigger receiving of multicast user data traffic during at least part of the first multicast control data window, terminate receiving of the multicast user data traffic at a termination time point in the first multicast control data window, and wherein the determining whether any of the one or more multicast control data change notification messages are not received during the first multicast control data window includes identifying whether the termination time point temporally occurred after all of the one or more multicast control data change notification messages are available to be received during the first multicast control data window.

In Example 97, the subject matter of Example 65 or 66 can optionally include wherein the determining whether any of the one or more multicast control data notification messages are not received during the first multicast control data window includes determining whether any of the one or more multicast control data notification messages are not received during the first multicast control data window using a predefined timing schedule of the available reception times of the one or more multicast control data notification messages.

In Example 98, the subject matter of Example 97 can optionally include wherein the baseband processing circuit is further configured to trigger receiving of system information from a mobile communication network, and identify the predefined timing schedule using the system information.

In Example 99, the subject matter of Example 97 can optionally include wherein the baseband processing circuit is further configured to identify the predefined timing schedule using received system information that indicates a periodicity of the one or more multicast control data notification messages and a quantity of the one or more multicast control data notification messages.

In Example 100, the subject matter of any one of Examples 65 to 94 can optionally include wherein the baseband processing circuit is further configured to trigger receiving of multicast user data traffic during the first multicast control data window.

In Example 101, the subject matter of any one of Examples 65 to 100 can optionally include wherein the one or more multicast control data notification messages indicate whether multicast control data will be updated in the multicast control data window immediately following the first multicast control data window.

In Example 102, the subject matter of any one of Examples 65 to 101 can optionally include wherein the second multicast control data window is the multicast control data window immediately following the first multicast control data window.

In Example 103, the subject matter of any one of Examples 65 to 102 can optionally include wherein the one or more multicast control data notification messages are Multicast Control Channel (MCCH) change notification messages, the first multicast control data window and the second multicast control data window are MCCH modification periods, and the multicast control data is MCCH data.

Example 104 is a mobile terminal device having a radio processing circuit and a baseband processing circuit adapted to interact with the radio processing circuit. The baseband processing circuit is configured to identify one or more Multicast Control Channel (MCCH) change notification messages available for reception during a first MCCH modification period, determine whether any of the one or more MCCH change notification messages are not received during the first MCCH modification period, and trigger receiving of MCCH data of a second MCCH modification period when none of the one or more MCCH change notification messages are received during the first MCCH modification period.

In Example 105, the subject matter of Example 104 can optionally include wherein the radio processing circuit is configured to receive the MCCH data of the second MCCH modification period responsive to the baseband processing circuit triggering receiving of the MCCH data of the second MCCH modification period, and provide the MCCH data of the second MCCH modification period to the baseband processing circuit.

In Example 106, the subject matter of Example 104 can optionally include wherein the baseband processing circuit is further configured to skip receiving of MCCH data of the second MCCH modification period when at least one of the one or more MCCH change notification messages was received during the first MCCH modification period and wherein the at least one MCCH change notification indicates that the MCCH data of the second MCCH modification period is equivalent to MCCH data of the first MCCH modification period.

In Example 107, the subject matter of Example 106 can optionally include wherein the radio processing circuit is configured to skip receiving of the MCCH data of the second MCCH modification period responsive to the baseband processing circuit skipping receiving of the MCCH data of the second MCCH modification period.

In Example 108, the subject matter of Example 106 can optionally include wherein the baseband processing circuit is further configured to trigger receiving of at least one of the one or more MCCH change notification messages, and identify whether the at least one MCCH change notification message indicates that the MCCH data of the second MCCH modification period is different from the MCCH data of the first MCCH modification period.

In Example 109, the subject matter of Example 108 can optionally include wherein the radio processing circuit is configured to receive the at least one of the one or more MCCH change notification messages responsive to the baseband processing circuit triggering receiving of the at least one of the one or more MCCH change notification messages, and provide the at least one of the one or more MCCH change notification messages to the baseband processing circuit.

In Example 110, the subject matter of Example 104 can optionally include wherein the identifying one or more MCCH change notification messages available for reception during a first MCCH modification period includes triggering receiving of system information derived from a mobile communication network that indicates a reception timing schedule for the one or more MCCH change notification messages.

In Example 111, the subject matter of Example 110 can optionally include wherein the radio processing circuit is configured to receive the system information responsive to the baseband processing circuit triggering receiving of the system information, and provide the system information to the baseband processing circuit.

In Example 112, the subject matter of Example 110 can optionally include wherein the system information is a System Information Block Type 13 (SIB13) message according to a Long Term Evolution (LTE) configuration.

In Example 113, the subject matter of Example 110 can optionally include wherein the baseband processing circuit is further configured to ascertain the reception timing schedule based on an MCCH change notification message repetition coefficient and an MCCH change notification message offset included in the system information.

In Example 114, the subject matter of Example 110 can optionally include wherein the determining whether any one of the one or more MCCH change notification messages are not received during the first MCCH modification period includes determining whether any one of the one or more MCCH change notification messages are not received during the first MCCH modification period using the reception timing schedule.

In Example 115, the subject matter of Example 104 can optionally include wherein the determining whether any one of the one or more MCCH change notification messages are not received during the first MCCH modification period includes determining whether none of the one or more MCCH change notification messages are received during the first MCCH modification period.

In Example 116, the subject matter of Example 104 can optionally include wherein the baseband processing circuit is further configured to identify a final MCCH change notification message that is the last occurring MCCH change notification message of the one or more MCCH change notification messages in time, and wherein the determining whether any of the one or more MCCH change notification messages are not received during the first MCCH modification period includes identifying whether receiving of Multicast Traffic Channel (MTCH) data was terminated after the final MCCH change notification message was available for reception during the first MCCH modification period.

In Example 117, the subject matter of Example 116 can optionally include wherein the determining whether any of the one or more MCCH change notification messages are not received during the first MCCH modification period includes identifying whether one or more evolved Multimedia Broadcast Multicast Service (eMBMS) reception outages occurred during the first MCCH modification period.

In Example 118, the subject matter of Example 117 can optionally include wherein the identifying whether one or more eMBMS reception outages occurred during the first MCCH modification period includes identifying whether a radio measurement caused an eMBMS reception outage during the first MCCH modification period.

In Example 119, the subject matter of Example 117 can optionally include wherein the identifying whether one or more eMBMS reception outages occurred during the first MCCH modification period includes identifying whether radio link failure caused an eMBMS reception outage during the first MCCH modification period.

In Example 120, the subject matter of Example 117 can optionally include wherein the identifying whether one or more eMBMS reception outages occurred during the first MCCH modification period includes identifying whether reception conflict caused an eMBMS reception outage during the first MCCH modification period.

In Example 121, the subject matter of any one of Examples 104 to 120 can optionally include wherein the one or more MCCH change notification messages indicate whether MCCH data will be updated in the MCCH modification period immediately following the first MCCH modification period, and wherein the second MCCH modification period is the MCCH modification period immediately following the first MCCH modification period.

In Example 122, the subject matter of any one of Examples 104 to 121 can optionally include wherein the first MCCH modification period contains a predefined number of MCCH change notification messages, and wherein the one or more MCCH change notification messages include all of the predefined number of MCCH change notification messages.

In Example 123, the subject matter of Example 122 can optionally include wherein the predefined number of MCCH change notification messages are scheduled to occur according to a predefined period within the first MCCH modification period.

In Example 124, the subject matter of Example 123 can optionally include wherein the baseband processing circuit is further configured to trigger receiving of system information that indicates the predefined period.

In Example 125, the subject matter of Example 124 can optionally include wherein the system information is a System Information Block Type 13 (SIB13) message according to a Long Term Evolution (LTE) configuration.

In Example 126, the subject matter of any one of Examples 104 to 125 can optionally include wherein the MCCH data of the second MCCH modification period is scheduled to occur periodically during the second MCCH modification period according to an MCCH repetition period.

In Example 127, the subject matter of Example 126 can optionally include wherein the baseband processing circuit is further configured to trigger receiving of system information from a mobile communication network that indicates the MCCH repetition period.

In Example 128, the subject matter of Example 127 can optionally include wherein the system information is a System Information Block Type 13 (SIB13) message according to a Long Term Evolution (LTE) configuration.

In Example 129, the subject matter of Example 104 can optionally include wherein the determining whether any of the one or more MCCH change notification messages are not received during the first MCCH modification period includes identifying whether one or more evolved Multimedia Broadcast Multicast Service (eMBMS) reception outages occurred during the available reception times of all of the one or more MCCH change notification messages during the first MCCH modification period.

In Example 130, the subject matter of Example 104 can optionally include wherein the baseband processing circuit is further configured to trigger receiving of Multicast Traffic Channel (MTCH) data during at least part of the first MCCH modification period, and terminate receiving of the MTCH data during the first MCCH modification period, and wherein the determining whether any of the one or more MCCH change notification messages are not received during the first MCCH modification period includes identifying whether the reception termination of the MTCH data caused receiving of all of the one or more MCCH change notification messages to be missed during the first MCCH modification period.

In Example 131, the subject matter of Example 104 can optionally include wherein the baseband processing circuit is further configured to trigger receiving of Multicast Traffic Channel (MTCH) data during at least part of the first MCCH modification period, and terminate receiving of the MTCH data at a termination time point in the first MCCH modification period, and wherein the determining whether any of the one or more MCCH change notification messages are not received during the first MCCH modification period includes identifying whether the termination time point temporally occurred after all of the one or more MCCH change notification messages are available to be received during the first MCCH modification period.

In Example 132, the subject matter of Example 104 can optionally include wherein the determining whether any of the one or more MCCH change notification messages are not received during the first MCCH modification period includes determining whether any of the one or more MCCH change notification messages are not received during the first MCCH modification period using a predefined timing schedule of the available reception times of the one or more MCCH change notification messages.

In Example 133, the subject matter of Example 132 can optionally include wherein the baseband processing circuit is further configured to trigger receiving of system information from a mobile communication network, and identify the predefined timing schedule using the system information.

In Example 134, the subject matter of Example 133 can optionally include wherein the baseband processing circuit is further configured to identify the predefined timing schedule using received system information that indicates an MCCH change notification message repetition coefficient and an MCCH change notification message offset.

In Example 135, the subject matter of any one of Examples 104 to 129 can optionally include wherein the baseband processing circuit is further configured to trigger receiving of Multicast Traffic Channel (MTCH) data during the first MCCH modification period.

In Example 136, the subject matter of any one of Examples 104 to 135 can optionally include wherein the one or more MCCH change notification messages indicate whether MCCH data will be updated in the MCCH modification period immediately following the first MCCH modification period.

In Example 137, the subject matter of any one of Examples 104 to 136 can optionally include wherein the second MCCH modification period is the MCCH modification period immediately following the first MCCH modification period.

Example 138 is a mobile baseband processing circuit including one or more digital processing circuits. The mobile baseband processing circuit is configured to identify one or more multicast control data notification messages available for reception during a first multicast control data window, determine whether any of the one or more multicast control data notification messages are not received during the first multicast control data window, and trigger receiving of multicast control data of a second multicast control data window when a predefined quantity of the one or more multicast control data notification messages are not received during the first multicast control data window.

In Example 139, the subject matter of Example 138 can optionally include wherein the one or more multicast control data notification messages indicate whether multicast control data will be updated in a subsequent multicast control data window occurring after the first multicast control data window In Example 140, the subject matter of Example 138 or 139 can optionally be further configured to skip receiving of the multicast control data of the second multicast control data window when the at least the predefined quantity of the one or more multicast control data notification messages are received during the first multicast control data window and wherein at least one of the one or more multicast control data notification message indicates that the multicast control data of the second multicast control data window is equivalent to multicast control data of the first multicast data window.

In Example 141, the subject matter of Example 140 can optionally be further configured to trigger receiving of at least one of the one or more multicast control data notification messages, and identify whether the at least one multicast control data change notification message indicates that the multicast control data of the second multicast control data window is different from the multicast control data of the first multicast control data window.

In Example 142, the subject matter of Example 138 or 139 can optionally be further configured to skip receiving of all multicast control data of the second multicast control data window when at least one of the one or more multicast control data notification messages was received during the first multicast control data window and wherein the at least one of the one or more multicast control data notification message indicates that multicast control data of the second multicast control data window is equivalent to multicast control data of the first multicast data window.

In Example 143, the subject matter of Example 138 or 139 can optionally include wherein the identifying one or more multicast control data notification messages scheduled for reception during a first multicast control data window includes triggering receiving of system information derived from a mobile communication network that indicates a reception timing schedule for the set of multicast control data messages.

In Example 144, the subject matter of Example 143 can optionally include wherein the system information is a System Information Block Type 13 (SIB13) message according to a Long Term Evolution (LTE) configuration.

In Example 145, the subject matter of Example 143 can optionally include wherein the determining whether any of the one or more multicast control data notification messages are not received during the first multicast control data window includes determining whether any of the one or more multicast control data notification messages are not received during the first multicast control data window using the reception timing schedule.

In Example 146, the subject matter of Example 138 or 139 can optionally include wherein the determining whether any of the one or more multicast control data notification messages are not received during the first multicast control data window includes determining whether none of the one or more multicast control data notification messages are received during the first multicast control data window.

In Example 147, the subject matter of Example 146 can optionally include wherein the triggering receiving of multicast control data of a second multicast control data window when a predefined quantity of the one or more multicast control data notification messages are not received during the first multicast control data window includes triggering receiving of the multicast control data of the second multicast control data window when none of the one or more multicast control data notification messages are received during the first multicast control data window.

In Example 148, the subject matter of Example 138 or 139 can optionally include wherein the determining whether any of the one or more multicast control data notification messages are not received during the first multicast control data window includes identifying whether receiving of multicast user data traffic was terminated during the first multicast control data window.

In Example 149, the subject matter of Example 138 or 139 can optionally be further configured to identify a final multicast control data notification message that is the last occurring multicast control data notification message of the one or more multicast control data notification messages in time, and wherein the determining whether any of the one or more multicast control data notification messages are not received during the first multicast control data window includes identifying whether receiving of multicast user data traffic was terminated after the final multicast control data notification message was available for reception during the first multicast control data window.

In Example 150, the subject matter of Example 138 or 139 can optionally include wherein the determining whether any of the one or more multicast control data notification messages are not received during the first multicast control data window includes identifying whether one or more multicast service reception outages occurred during the first multicast control data window.

In Example 51, the subject matter of Example 150 can optionally include wherein the identifying whether one or more multicast service reception outages occurred during the first multicast control data window includes identifying whether a radio measurement caused a multicast service outage during the first multicast control data window.

In Example 152, the subject matter of Example 150 can optionally include wherein the identifying whether one or more multicast service reception outages occurred during the first multicast control data window includes identifying whether radio link failure caused a multicast service outage during the first multicast control data window.

In Example 153, the subject matter of Example 150 can optionally include wherein the identifying whether one or more multicast service reception outages occurred during the first multicast control data window includes identifying whether reception conflict caused a multicast service outage during the first multicast control data window.

In Example 154, the subject matter of any one of Examples 138 to 153 can optionally include wherein the one or more multicast control data notification messages indicate whether multicast control data will be updated in the multicast control data window immediately following the first multicast control data window, and wherein the second multicast control data window is the multicast control data window immediately following the first multicast control data window.

In Example 155, the subject matter of any one of Examples 138 to 154 can optionally include wherein the first multicast control data window contains a predefined number of multicast control data notification messages, and wherein the one or more multicast control data notification messages include all of the predefined number of multicast control data notification messages.

In Example 156, the subject matter of Example 155 can optionally include wherein the predefined number of multicast control data notification messages are scheduled to occur according to a predefined period within the first multicast control data window.

In Example 157, the subject matter of Example 156 can optionally be further configured to trigger receiving of system information that indicates the predefined period.

In Example 158, the subject matter of Example 157 can optionally include wherein the system information is a System Information Block Type 13 (SIB13) message according to a Long Term Evolution (LTE) configuration.

In Example 159, the subject matter of any one of Examples 138 to 158 can optionally include wherein the multicast control data of the second multicast control data window is scheduled to occur periodically during the second multicast control data window according to a multicast control data repetition period.

In Example 160, the subject matter of Example 159 can optionally include wherein the multicast control data reception data period is a Multicast Control Channel (MCCH) repetition period.

In Example 161, the subject matter of Example 159 can optionally be further configured to trigger receiving of system information from a mobile communication network that indicates the multicast control data repetition period.

In Example 162, the subject matter of Example 138 or 139 can optionally include wherein the determining whether any of the one or more multicast control data notification messages are not received during the first multicast control data window includes identifying whether one or more multicast service reception outages occurred during the available reception times of all of the one or more multicast control data notification messages during the first multicast control data window.

In Example 163, the subject matter of Example 138 or 139 can optionally be further configured to trigger receiving of multicast user data traffic during at least part of the first multicast control data window, terminate receiving of the multicast user data traffic during the first multicast control data window, and wherein the determining whether any of the one or more multicast control data notification messages are not received during the first multicast control data window includes identifying whether the reception termination of the multicast user data traffic caused receiving of all of the one or more multicast control data notification messages to be missed during the first multicast control data window.

In Example 164, the subject matter of Example 138 or 139 can optionally be further configured to trigger receiving of multicast user data traffic during at least part of the first multicast control data window, terminate receiving of the multicast user data traffic at a termination time point in the first multicast control data window, and wherein the determining whether any of the one or more multicast control data change notification messages are not received during the first multicast control data window includes identifying whether the termination time point temporally occurred after all of the one or more multicast control data change notification messages are available to be received during the first multicast control data window.

In Example 165, the subject matter of Example 138 or 139 can optionally include wherein the determining whether any of the one or more multicast control data notification messages are not received during the first multicast control data window includes determining whether any of the one or more multicast control data notification messages are not received during the first multicast control data window using a predefined timing schedule of the available reception times of the one or more multicast control data notification messages.

In Example 166, the subject matter of Example 165 can optionally be further configured to trigger receiving of system information from a mobile communication network, and identify the predefined timing schedule using the system information.

In Example 167, the subject matter of Example 165 can optionally be further configured to identify the predefined timing schedule using received system information that indicates a periodicity of the one or more multicast control data notification messages and a quantity of the one or more multicast control data notification messages.

In Example 168, the subject matter of any one of Examples 138 to 162 can optionally be further configured to trigger receiving of multicast user data traffic during the first multicast control data window.

In Example 169, the subject matter of any one of Examples 138 to 168 can optionally include wherein the one or more multicast control data notification messages indicate whether multicast control data will be updated in the multicast control data window immediately following the first multicast control data window.

In Example 170, the subject matter of any one of Examples 138 to 169 can optionally include wherein the second multicast control data window is the multicast control data window immediately following the first multicast control data window.

In Example 171, the subject matter of any one of Examples 138 to 170 can optionally include wherein the one or more multicast control data notification messages are Multicast Control Channel (MCCH) change notification messages, the first multicast control data window and the second multicast control data window are MCCH modification periods, and the multicast control data is MCCH data.

In Example 172, the subject matter of any one of Examples 138 to 171 can optionally further include a baseband memory.

Example 173 is a mobile baseband processing circuit including one or more digital processing circuits, the mobile baseband processing circuit configured to identify one or more Multicast Control Channel (MCCH) change notification messages available for reception during a first MCCH modification period, determine whether any of the one or more MCCH change notification messages are not received during the first MCCH modification period, and trigger receiving of MCCH data of a second MCCH modification period when none of the one or more MCCH change notification messages are received during the first MCCH modification period.

In Example 174, the subject matter of Example 173 can optionally be further configured to skip receiving of MCCH data of the second MCCH modification period when at least one of the one or more MCCH change notification messages was received during the first MCCH modification period and wherein the at least one MCCH change notification indicates that the MCCH data of the second MCCH modification period is equivalent to MCCH data of the first MCCH modification period.

In Example 175, the subject matter of Example 174 can optionally be further configured to trigger receiving of at least one of the one or more MCCH change notification messages, and identify whether the at least one MCCH change notification message indicates that the MCCH data of the second MCCH modification period is different from the MCCH data of the first MCCH modification period.

In Example 176, the subject matter of Example 173 can optionally include wherein the identifying one or more MCCH change notification messages available for reception during a first MCCH modification period includes triggering receiving of system information derived from a mobile communication network that indicates a reception timing schedule for the one or more MCCH change notification messages.

In Example 177, the subject matter of Example 176 can optionally include wherein the system information is a System Information Block Type 13 (SIB13) message according to a Long Term Evolution (LTE) configuration.

In Example 178, the subject matter of Example 176 can optionally be further configured to ascertain the reception timing schedule based on an MCCH change notification message repetition coefficient and an MCCH change notification message offset included in the system information.

In Example 179, the subject matter of Example 176 can optionally include wherein the determining whether any one of the one or more MCCH change notification messages are not received during the first MCCH modification period includes determining whether any one of the one or more MCCH change notification messages are not received during the first MCCH modification period using the reception timing schedule.

In Example 180, the subject matter of Example 173 can optionally include wherein the determining whether any one of the one or more MCCH change notification messages are not received during the first MCCH modification period includes determining whether none of the one or more MCCH change notification messages are received during the first MCCH modification period.

In Example 181, the subject matter of Example 173 can optionally be further configured to identify a final MCCH change notification message that is the last occurring MCCH change notification message of the one or more MCCH change notification messages in time, and wherein the determining whether any of the one or more MCCH change notification messages are not received during the first MCCH modification period includes identifying whether receiving of Multicast Traffic Channel (MTCH) data was terminated after the final MCCH change notification message was available for reception during the first MCCH modification period.

In Example 182, the subject matter of Example 181 can optionally include wherein the determining whether any of the one or more MCCH change notification messages are not received during the first MCCH modification period includes identifying whether one or more evolved Multimedia Broadcast Multicast Service (eMBMS) reception outages occurred during the first MCCH modification period.

In Example 183, the subject matter of Example 182 can optionally include wherein the identifying whether one or more eMBMS reception outages occurred during the first MCCH modification period includes identifying whether a radio measurement caused an eMBMS reception outage during the first MCCH modification period.

In Example 184, the subject matter of Example 182 can optionally include wherein the identifying whether one or more eMBMS reception outages occurred during the first MCCH modification period includes identifying whether radio link failure caused an eMBMS reception outage during the first MCCH modification period.

In Example 185, the subject matter of Example 182 can optionally include wherein the identifying whether one or more eMBMS reception outages occurred during the first MCCH modification period includes identifying whether reception conflict caused an eMBMS reception outage during the first MCCH modification period.

In Example 186, the subject matter of any one of Examples 173 to 185 can optionally include wherein the one or more MCCH change notification messages indicate whether MCCH data will be updated in the MCCH modification period immediately following the first MCCH modification period, and wherein the second MCCH modification period is the MCCH modification period immediately following the first MCCH modification period.

In Example 187, the subject matter of any one of Examples 173 to 186 can optionally include wherein the first MCCH modification period contains a predefined number of MCCH change notification messages, and wherein the one or more MCCH change notification messages include all of the predefined number of MCCH change notification messages.

In Example 188, the subject matter of Example 187 can optionally include wherein the predefined number of MCCH change notification messages are scheduled to occur according to a predefined period within the first MCCH modification period.

In Example 189, the subject matter of Example 188 can optionally be further configured to trigger receiving of system information that indicates the predefined period.

In Example 190, the subject matter of Example 189 can optionally include wherein the system information is a System Information Block Type 13 (SIB13) message according to a Long Term Evolution (LTE) configuration.

In Example 191, the subject matter of any one of Examples 173 to 190 can optionally include wherein the MCCH data of the second MCCH modification period is scheduled to occur periodically during the second MCCH modification period according to an MCCH repetition period.

In Example 192, the subject matter of Example 191 can optionally be further configured to trigger receiving of system information from a mobile communication network that indicates the MCCH repetition period.

In Example 193, the subject matter of Example 192 can optionally include wherein the system information is a System Information Block Type 13 (SIB13) message according to a Long Term Evolution (LTE) configuration.

In Example 194, the subject matter of Example 173 can optionally include wherein the determining whether any of the one or more MCCH change notification messages are not received during the first MCCH modification period includes identifying whether one or more evolved Multimedia Broadcast Multicast Service (eMBMS) reception outages occurred during the available reception times of all of the one or more MCCH change notification messages during the first MCCH modification period.

In Example 195, the subject matter of Example 173 can optionally be further configured to trigger receiving of Multicast Traffic Channel (MTCH) data during at least part of the first MCCH modification period, and terminate receiving of the MTCH data during the first MCCH modification period, and wherein the determining whether any of the one or more MCCH change notification messages are not received during the first MCCH modification period includes identifying whether the reception termination of the MTCH data caused receiving of all of the one or more MCCH change notification messages to be missed during the first MCCH modification period.

In Example 196, the subject matter of Example 173 can optionally be further configured to trigger receiving of Multicast Traffic Channel (MTCH) data during at least part of the first MCCH modification period, and terminate receiving of the MTCH data at a termination time point in the first MCCH modification period, and wherein the determining whether any of the one or more MCCH change notification messages are not received during the first MCCH modification period includes identifying whether the termination time point temporally occurred after all of the one or more MCCH change notification messages are available to be received during the first MCCH modification period.

In Example 197, the subject matter of Example 173 can optionally include wherein the determining whether any of the one or more MCCH change notification messages are not received during the first MCCH modification period includes determining whether any of the one or more MCCH change notification messages are not received during the first MCCH modification period using a predefined timing schedule of the available reception times of the one or more MCCH change notification messages.

In Example 198, the subject matter of Example 197 can optionally be further configured to trigger receiving of system information from a mobile communication network, and identify the predefined timing schedule using the system information.

In Example 199, the subject matter of Example 198 can optionally be further configured to identify the predefined timing schedule using received system information that indicates an MCCH change notification message repetition coefficient and an MCCH change notification message offset.

In Example 200, the subject matter of any one of Examples 173 to 194 can optionally be further configured to trigger receiving of Multicast Traffic Channel (MTCH) data during the first MCCH modification period.

In Example 201, the subject matter of any one of Examples 173 to 200 can optionally include wherein the one or more MCCH change notification messages indicate whether MCCH data will be updated in the MCCH modification period immediately following the first MCCH modification period.

In Example 202, the subject matter of any one of Examples 173 to 201 can optionally include wherein the second MCCH modification period is the MCCH modification period immediately following the first MCCH modification period.

In Example 203, the subject matter of any one of Examples 173 to 202 can optionally further include a baseband memory.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device having a radio processing circuit and a baseband processing circuit adapted to interact with the radio processing circuit, the baseband processing circuit configured to:
    identify one or more multicast control data notification messages available for reception during a first multicast control data window;
    determine whether any of the one or more multicast control data notification messages are not received during the first multicast control data window, which comprises:
        identifying whether one or more multicast service reception outages occurred during the first multicast control data window; and
    trigger receiving of multicast control data of a second multicast control data window when a predefined quantity of the one or more multicast control data notification messages are not received during the first multicast control data window.

2. The mobile terminal device of claim 1, wherein the one or more multicast control data notification messages indicate whether multicast control data will be updated in a subsequent multicast control data window occurring after the first multicast control data window.

3. The mobile terminal device of claim 1, wherein the baseband processing circuit is further configured to:
    skip receiving of the multicast control data of the second multicast control data window when at least the predefined quantity of the one or more multicast control data notification messages are received during the first multicast control data window and wherein at least one of the one or more multicast control data notification message indicates that the multicast control data of the second multicast control data window is equivalent to multicast control data of the first multicast data window.

4. The mobile terminal device of claim 3, wherein the baseband processing circuit is further configured to:
    trigger receiving of at least one of the one or more multicast control data notification messages; and
    identify whether the at least one multicast control data change notification message indicates that the multicast control data of the second multicast control data window is different from the multicast control data of the first multicast control data window.

5. The mobile terminal device of claim 1, wherein the identifying one or more multicast control data notification messages scheduled for reception during a first multicast control data window comprises:
    triggering receiving of system information derived from a mobile communication network that indicates a reception timing schedule for the set of multicast control data messages.

6. The mobile terminal device of claim 1, wherein the determining whether any of the one or more multicast control data notification messages are not received during the first multicast control data window comprises:
    determining whether none of the one or more multicast control data notification messages are received during the first multicast control data window.

7. The mobile terminal device of claim 6, wherein the triggering receiving of multicast control data of a second multicast control data window when a predefined quantity of the one or more multicast control data notification messages are not received during the first multicast control data window comprises:
    triggering receiving of the multicast control data of the second multicast control data window when none of the one or more multicast control data notification messages are received during the first multicast control data window.

8. The mobile terminal device of claim 1, wherein the determining whether any of the one or more multicast control data notification messages are not received during the first multicast control data window further comprises:
    identifying whether receiving of multicast user data traffic was terminated during the first multicast control data window.

9. The mobile terminal device of claim 1, wherein the baseband processing circuit is further configured to:
    identify a final multicast control data notification message that is the last occurring multicast control data notification message of the one or more multicast control data notification messages in time; and wherein the determining whether any of the one or more multicast control data notification messages are not received during the first multicast control data window further comprises:

identifying whether receiving of multicast user data traffic was terminated after the final multicast control data notification message was available for reception during the first multicast control data window.

10. The mobile terminal device of claim 1, wherein the one or more multicast control data notification messages indicate whether multicast control data will be updated in the multicast control data window immediately following the first multicast control data window; and wherein the second multicast control data window is the multicast control data window immediately following the first multicast control data window.

11. The mobile terminal device of claim 1, wherein the first multicast control data window contains a predefined number of multicast control data notification messages, and wherein the one or more multicast control data notification messages comprise all of the predefined number of multicast control data notification messages.

12. The mobile terminal device of claim 1, wherein the baseband processing circuit is further configured to:

trigger receiving of multicast user data traffic during at least part of the first multicast control data window;

terminate receiving of the multicast user data traffic during the first multicast control data window; and wherein the determining whether any of the one or more multicast control data notification messages are not received during the first multicast control data window further comprises:

identifying whether the reception termination of the multicast user data traffic caused receiving of all of the one or more multicast control data notification messages outside of the one or more multicast service reception outages to be missed during the first multicast control data window.

13. The mobile terminal device of claim 1, wherein the determining whether any of the one or more multicast control data notification messages are not received during the first multicast control data window further comprises:

determining whether any of the one or more multicast control data notification messages are not received during the first multicast control data window using a predefined timing schedule of the available reception times of the one or more multicast control data notification messages.

14. The mobile terminal device of claim 1, wherein the second multicast control data window is the multicast control data window immediately following the first multicast control data window.

15. The mobile terminal device of claim 1, wherein the one or more multicast control data notification messages are Multicast Control Channel (MCCH) change notification messages, the first multicast control data window and the second multicast control data window are MCCH modification periods, and the multicast control data is MCCH data.

16. A mobile baseband processing circuit comprising one or more digital processing circuits, the mobile baseband processing circuit configured to:

identify one or more multicast control data notification messages available for reception during a first multicast control data window;

determine whether any of the one or more multicast control data notification messages are not received during the first multicast control data window, which comprises:

identifying whether one or more multicast service reception outages occurred during the first multicast control data window; and trigger receiving of multicast control data of a second multicast control data window when a predefined quantity of the one or more multicast control data notification messages are not received during the first multicast control data window.

17. The mobile baseband processing circuit of claim 16, further configured to:

skip receiving of the multicast control data of the second multicast control data window when at least the predefined quantity of the one or more multicast control data notification messages are received during the first multicast control data window and wherein at least one of the one or more multicast control data notification message indicates that the multicast control data of the second multicast control data window is equivalent to multicast control data of the first multicast data window.

18. The mobile baseband processing circuit of claim 17, further configured to:

trigger receiving of at least one of the one or more multicast control data notification messages; and identify whether the at least one multicast control data change notification message indicates that the multicast control data of the second multicast control data window is different from the multicast control data of the first multicast control data window.

19. The mobile baseband processing circuit of claim 16, wherein the one or more multicast control data notification messages are Multicast Control Channel (MCCH) change notification messages, the first multicast control data window and the second multicast control data window are MCCH modification periods, and the multicast control data is MCCH data.

20. A method of performing mobile communications comprising:

identifying one or more multicast control data notification messages available for reception during a first multicast control data window;

determining whether any of the one or more multicast control data notification messages are not received during the first multicast control data window, which comprises:

identifying whether one or more multicast service reception outages occurred during the first multicast control data window; and triggering receiving of multicast control data of a second multicast control data window when a predefined quantity of the one or more multicast control data notification messages are not received during the first multicast control data window.

21. The method of claim 20, wherein the one or more multicast control data notification messages indicate whether multicast control data will be updated in a subsequent multicast control data window occurring after the first multicast control data window.

22. The method of claim 20, further comprising:

skipping receiving of the multicast control data of the second multicast control data window when at least the predefined quantity of the one or more multicast control data notification messages are received during the first multicast control data window and wherein at least one of the one or more multicast control data notification message indicates that the multicast control data of the second multicast control data window is equivalent to multicast control data of the first multicast data window.

23. The method of claim 20, wherein the one or more multicast control data notification messages indicate whether multicast control data will be updated in the multicast control data window immediately following the first multicast control data window; and wherein the second multicast control data window is the multicast control data window immediately following the first multicast control data window.

24. The method of claim 20, wherein the one or more multicast control data notification messages are Multicast Control Channel (MCCH) change notification messages, the first multicast control data window and the second multicast control data window are MCCH modification periods, and the multicast control data is MCCH data.

* * * * *